United States Patent [19]
Shottan

[11] Patent Number: 5,247,643
[45] Date of Patent: Sep. 21, 1993

[54] MEMORY CONTROL CIRCUIT FOR OPTIMIZING COPY BACK/LINE FILL OPERATION IN A COPY BACK CACHE SYSTEM

[75] Inventor: Shmuel Shottan, Mission Viejo, Calif.
[73] Assignee: AST Research, Inc., Irvine, Calif.
[21] Appl. No.: 639,245
[22] Filed: Jan. 8, 1991
[51] Int. Cl.$^5$ ............................................. G06F 13/00
[52] U.S. Cl. ............................ 395/425; 364/DIG. 1
[58] Field of Search ................ 364/200, 900; 395/400, 395/425

[56] References Cited

U.S. PATENT DOCUMENTS

| | | | |
|---|---|---|---|
| 4,803,621 | 2/1989 | Kelly | 364/200 |
| 4,894,770 | 1/1990 | Ward et al. | 365/230.03 |
| 4,933,835 | 6/1990 | Sachs et al. | 395/425 |
| 4,933,837 | 6/1990 | Freidin | 364/200 |
| 5,022,004 | 6/1991 | Kurtze et al. | 365/189.07 |
| 5,053,874 | 8/1991 | Gagliardo et al. | 364/200 |

OTHER PUBLICATIONS

Cliff Rhodes, "Caches keep main memories from slowing down fast CPUs,"*Electronic Design*, Jan. 21, 1982, pp. 179–184.
Cliff Rhodes, et al., "Cache-memory functions surface on VLSI chip," *Electronic Design*, Feb. 18, 1982, pp. 159–163.
Jerry VanAken, "Match cache architecture to the computer system," *Electronic Design*, Mar. 4, 1982, pp. 93–95, 97, 98.
Efrem G. Mallach, "What does cache buy for you?", *Mini-Micro Systems*, May 1982, pp. 267, 268, 271.
Robert Hartwig, et al., "Large disk cache uses fast 64k-by-1 static RAMs to speed data-base accesses," *Electronic Design*, Sep. 19, 1985, pp. 193–198, 200, 202.
Howard Sachs, "Improved Cache Scheme Boosts System Performance," *Computer Design*, Nov. 1, 1985, pp. 83–86.
Alan Jay Smith, "Cache memory design: an evolving art," *IEEE Spectrum*, Dec. 1987, pp. 40–44.
David Shear, "Cache-memory systems benefit from on-chip solutions," *EDN*, Dec. 10, 1987, 245–249, 252, 253, 258, 260.
William Ringer, "How to Manage Your Cache Options," *ESD: The Electronic System Design Magazine*, Jun. 1988, pp. 71, 72, 74, 75.
Jim Langston, "Boost DRAM performance with SRAM caching scheme," *Electronic Design*, Jun. 9, 1988, pp. 107–112.
Richard Crisp, et al., "Designing A Cache For A Fast Processor," *Electronic Design*, Oct. 13, 1988, pp. 111–116, 118.
Mark D. Hill, "A Case for Direct-Mapped Caches," *Computer*, Dec. 1988, pp. 25–40.
Mammad Safai, "Cache Design Paces 33-MHz 80386 CPUs," *Microprocessor Design Guide*, 1989, pp. 39, 42, 44, 46, 48.
Joseph C. Circello, et al., "Refined method brings precision to performance analysis," *Computer Design*, Mar. 1, 1989, pp. 77–80, 82.
Jim Peterson, "System-Level Concerns Set Performance Gains," *High Performance Systems*, Sep. 1989, pp. 71–73, 76, 77.
Raymond M. Leong, "Cache memories and MMUs work together in high-speed systems," *EDN*, Mar. 15, 1990, pp. 169–172, 174.

*Primary Examiner*—Joseph L. Dixon
*Assistant Examiner*—Reba I. Elmore
*Attorney, Agent, or Firm*—Knobbe, Martens, Olson & Bear

[57] ABSTRACT

A memory system for use with a copy back-cache system includes a control circuit that reduces the amount of time to complete a copy back/line fill operation in which a first line of data from the cache is stored in the memory system and then a second line of data is retrieved from the memory system and transferred to the cache system. Unlike conventional memory systems where the line of data to be copied back is likely to be stored in the memory system at a row address that differs from the row address of the line of data to be retrieved from the memory system for the line fill, the memory system of the present invention assures that the copy back data and the line fill data are located at the same row address in the memory system. Thus, a single row address can be applied once at the beginning of the copy back/line fill operation, thereby saving the row address precharge time and the row address access time required to switch row addresses between the two portions of the operation.

7 Claims, 19 Drawing Sheets

| 256K×4 RAM ADDRESS INPUTS | 8 | 7 | 6 | 5 | 4 | 3 | 2 | 1 | 0 |
|---|---|---|---|---|---|---|---|---|---|
| PROCESSOR ADDRESS DURING RAS | 15 | 14 | 13 | 12 | 11 | 10 | 9 | 8 | 7 |
| PROCESSOR ADDRESS DURING CAS | 20 | 19 | 18 | 17 | 16 | 6 | 5 | 4 | 3 |

FIG. 19

| 1M×4 RAM ADDRESS INPUTS | 9 | 8 | 7 | 6 | 5 | 4 | 3 | 2 | 1 | 0 |
|---|---|---|---|---|---|---|---|---|---|---|
| PROCESSOR ADDRESS DURING RAS | 6 | 15 | 14 | 13 | 12 | 11 | 10 | 9 | 8 | 7 |
| PROCESSOR ADDRESS DURING CAS | 21 | 20 | 19 | 18 | 17 | 16 | 22 | 5 | 4 | 3 |

FIG. 20

MEMORY CONTROL CIRCUIT FOR OPTIMIZING COPY BACK/LINE FILL OPERATION IN A COPY BACK CACHE SYSTEM

BACKGROUND OF THE INVENTION

1. Field of the Invention

The present invention is in the field of computer systems, and, more particularly, is in the field of memory control systems for main memory used in combination with a copy back cache system.

2. Description of the Related Art

Cache systems are utilized in computers to provide a relatively small amount of high speed memory to hold data transferred from a main memory to a processor. Basically, the cache system maintains a copy of the data from selected portions of the main memory so that the processor can access the high speed memory in the cache system rather than the relatively slow main memory. When the processor accesses a location in the main memory that is not currently copied in the cache memory, new data must be stored in the cache memory. Generally, the new data is written to a cache memory location previously occupied by data from a different main memory location. Thus, the previous data must be discarded.

There are two types of cache memory systems which are identified by the method of handling data written to the cache from the processor. One type is a "copy through" cache system in which data written to the cache are also immediately written to the main memory so that the cache memory locations and the corresponding main memory locations always comprise the same data. Thus, when data in the copy through cache system needs to be discarded, it does not need to be written to the main memory. However, when the processor is frequently writing to the same memory locations, a substantial time penalty is incurred since the slower main memory is written each time.

The present invention is related to the second type of cache system in which data from the processor is initially written only to the cache memory and which is frequently referred to as a "copy back" or "write back" cache system, and which will be referred to herein as a copy back cache system. In a copy back cache system, the data is only copied back or written back to the main memory when new data needs to be stored in a cache memory location that has changed since it was first stored in the cache memory. This is an advantage over the copy through cache system when the same locations in the cache memory remain in the cache memory and are being frequently changed by the processor. One of the disadvantages of a copy back cache system is the penalty that must be paid on a cache miss when the cache location to be filled is "dirty", that is, the data in the location has changed since the line was filled from memory. When a dirty miss occurs, the changed line must be rewritten to main memory and then the new line of data must be retrieved from main memory to refill the cache line. Thus, for example, in a cache having 128-bit cache lines (i.e., four 32-bit double words per line), four 32-bit double words must be written to the main memory and four 32-bit double words must be retrieved from main memory. Thus, the penalty that must be paid is the time required to write the dirty line back to main memory and retrieve the new line.

Part of the time penalty results from the use of dynamic memory circuits in the main memory. Such dynamic memory circuits have the advantage that a greater amount of memory can be provided in a given integrated circuit size. However, one of the disadvantages of dynamic memory circuits is that the circuits are organized as an array of cell locations defined by rows and columns. For example a 256K × 1 dynamic random access memory (RAM) includes nine address lines that are time multiplexed to provide the eighteen address inputs needed to address the 262,144 address locations in the RAM.

During a first portion of a memory read cycle, a first nine-bit portion of the address is applied to the nine address lines and a row address select (RAS) signal is activated to gate the nine bits into an internal row address buffer in the RAM and to initiate an access to one row of 512 rows of the memory array. Thereafter, a second nine-bit portion of the address is applied to the nine address lines and a column address select (CAS) signal is activated to gate the nine bits into an internal column address buffer. Each row of the memory array accessed by the RAS signal includes 512 storage cells, each of which provides an output to a column decoder. The outputs of the column address buffer are decoded by the column decoder to select one of the 512 outputs of the column outputs to be the data output of the dynamic RAM. The operation of the dynamic RAM for a write cycle is similar to a read cycle, except that external data is applied to the RAM and the column decoder routes the data to one of the columns of the selected row to replace the data previously in the selected cell in that row.

Larger dynamic RAMs can be provided by increasing the number of rows in the memory array, increasing the number of storage cells per row, or both. For example, 256K × 4 dynamic RAMs are available which provide 1 Megabits (1,048,576 bits) of data storage where each row includes 2048 storage cells. Four storage cells are selected by each column address to provide output data or to store input data. The same storage capacity can be provided in a 1M × 1 dynamic RAM which has 1,024 rows with 1,024 storage cells per row. In the case of a 1M × 1 RAM, an additional address input line is provided to provide ten address lines that are multiplexed as before to select one of the 1,024 rows and to select one of the 1,024 columns (i.e., storage cells) in each row.

Each time a new row of the memory array is accessed, the RAS signal must first be returned to an inactive level to precondition the memory array for the next access. The minimum amount of time that the RAS signal must remain inactive before being activated for the next access is referred to as the RAS precharge time of the memory array. The precharge time varies with respect to the speed of the dynamic RAM, and for an exemplary high speed dynamic RAM may be in the 70–100 nanosecond range. In addition, when the RAS signal is activated to begin an access, the greatest portion of the total access time is RAS access time, that is the amount of time from the activation of the RAS signal until valid data is available on the output of the RAM. The row access time may be as much as 80 nanoseconds in the exemplary high speed dynamic RAM discussed herein. In contrast, the column access time, that is the amount of time from the activation of the CAS signal until the data is valid is typically less than half the row access time (e.g., approximately 25–30 nanoseconds in an exemplary high speed dynamic RAM).

Because of the penalty of the large row access times, many dynamic RAMs operate in the so-called page mode. That is, when a RAS signal is applied to the RAM to access a particular row of the memory array, more than one cell location in the accessed row can be read from or written to without applying a new RAS signal for each access. This is accomplished by changing only the CAS signal for each new access. The CAS signal must be deactivated for a minimum CAS precharge time between accesses. The CAS precharge time is approximately 25 nanoseconds in the exemplary high speed dynamic RAM discussed herein. Thus, the total time between accesses in the page mode is less than 60 nanoseconds as compared to the approximately 150 nanosecond access time when the RAS signal is changed for each access. This saves a substantial amount of time in accessing data from the same row of a memory, for example, when accessing a set of sequential instructions or data, or executing a loop in the same general memory locations, or the like.

The page mode of dynamic RAMs has found to be useful when the dynamic RAMs are included in main memory connected to a cache memory such as that found, for example, in the Intel® 80486 microprocessor. When a line of data is read from the main memory to be stored in the cache memory, each byte of the line of data is generally located within the same row of the memory array of the RAM. Thus, all the bytes of the line of data can be transferred from the main memory to the cache memory with only a single row access. However, theretofore, page mode of dynamic RAMs have not been used to its fullest extent with respect to copy back cache memory systems wherein a dirty line of data in the cache memory is swapped for a new line of data from the main memory. In particular, the line of data to be copied back to the main memory is generally located in a different page of the main memory. Thus, it is necessary to activate a first row of the memory array for the copy back portion of the data swap operation and then activate a second row of the memory array for the line fill portion of the swap operation. Thus, an additional 120 nanoseconds is included in the swap operation to accommodate the RAS precharge time and the greater RAS access time when the row access changes. The 120-nanosecond increase in the swap time adds up to a substantial amount of time overhead in operations where there are frequent copy back and line fill operations.

Some cache systems have responded to this problem by temporarily transferring the dirty data to a register, retrieving the new data from memory and then storing the dirty data to the memory from the register. This increases the amount of circuitry involved and does not solve the problem if a processor immediately accesses the cache system for new data that results in a dirty hit. Dirty data from a previous dirty hit that is already in the register must be transferred from the register to the memory before new dirty data from the current dirty hit can be transferred to the register and thus before beginning the read access to the memory. Thus, an appropriate solution is to reduce the amount of time for storing the dirty data and retrieving the new data from memory.

SUMMARY OF THE INVENTION

The present invention substantially reduces the amount of overhead in copy back and line fill operations between a cache memory system and a main memory by providing a unique main memory organization that is tailored to the copy back and line fill operations. In particular, the main memory is organized so that the line of dirty data swapped out from the cache memory to the main memory is located in the same row of the memory arrays of the dynamic RAMs of the main memory as the line of new data to be transferred from the main memory to the cache memory. Thus, only a single RAS precharge and RAS access time is required at the beginning of the copy back portion of the swap operation, with the following writes and reads occurring with only changes in the column addresses applied to the dynamic RAMs.

One aspect of the present invention is a memory system for use in association with a copy back cache system. The memory system optimizes a copy back/line fill operation which includes a copy back portion in which data are transferred from said cache system to the memory system and a line fill portion in which data are transferred from the memory system to the cache system. The memory system comprises a dynamic random access memory (RAM) having a plurality of address inputs, a row address select input, a column address select input and a write enable input. The dynamic RAM is responsive to an address applied to the address inputs when the row address select input is activated to access a row of data storage cells. The dynamic RAM is responsive to an address applied to the address inputs when the column address select input is activated to access at least one cell in the row of data storage cells. An address select circuit receives address inputs from an address input bus. The address select circuit receives a first set of address bits associated with data to be written into the RAM during the copy back portion and receives a second set of address bits associated with data to be read from the RAM during the line fill portion. The address select circuit provides the first set of address bits to the RAM as a first row address and a first column address and provides the second set of address bits to the RAM as a second row address and a second column address. The address select circuit selects address bits from the first and second sets of address bits so that the first row address and the second row address are identical. A memory control circuit activates the row address select input at the beginning of the copy back portion to select a single row address for both the copy back portion and the line fill portion of the copy back/line fill operation.

A second aspect of the present invention is a method of decreasing the time required to complete a copy back/line fill operation in a memory system connected to a cache system. The method comprises the step of applying a first set of address bits to the memory system during a copy back portion of the copy back/line fill operation to select a location in the memory system to store data from the cache system. The method includes the further step of applying a second set of address bits to the memory system during a line fill portion of the copy back/line fill operation to select a location in the memory system from which to read data to transfer to the cache system. The second set of address bits comprises a first plurality of address bits that are common to a corresponding plurality of address bits in the first set of address bits and comprises a second plurality of address bits that are different from a corresponding plurality of address bits in the first set of address bits. The method further includes the step of applying the first plurality of address bits to a dynamic random access memory as a row address during the copy back portion and the line fill portion so that only a single row access of the dynamic random access memory is required to complete the copy back/line fill operation.

A still further aspect of the invention is a memory control circuit that drives the address and control inputs of a dynamic random access memory (RAM) connected to receive data from a copy back cache system. The memory control circuit comprises a timing circuit that generates a single row address select signal as a control input to the dynamic RAM for the copy back/line fill operation. The memory control circuit also generates a first column address select signal as a control input to the dynamic RAM during a copy back portion of the copy back/line fill operation and generates a second column address select signal during a line fill portion of the copy back/line fill operation. An address select circuit receives a copy back address comprising a first plurality of address bits and a second plurality of address bits to select a location in the dynamic RAM to store data from the cache system. The address select circuit also receives a line fill address comprising a third plurality of address bits and a fourth plurality of address bits to select a location in the dynamic RAM from which to retrieve data to transfer to the cache system. The third plurality of address bits are identical to the first plurality of address bits. The address select circuit applies the first plurality of address bits to the dynamic RAM when the row address select signal is activated to apply a single row address to the dynamic RAM for both the copy back portion and the line fill portion. The address select circuit applies the second plurality of address bits to the dynamic RAM when the first column address select signal is activated during the copy back portion and applies the fourth plurality of address bits to the dynamic RAM when the second column address select signal is activated.

BRIEF DESCRIPTION OF THE DRAWINGS

FIG. 19 is a table illustrating the mapping of the processor address bits to the row and column addresses of 256K×4 dynamic RAMs in accordance with the present invention.

FIG. 20 is a table illustrating the mapping of the processor address bits to the row and column addresses of 1M×4 dynamic RAMs in accordance with the present invention.

DETAILED DESCRIPTION OF THE PREFERRED EMBODIMENT

The present invention is directed to a memory controller for a main memory to be used in combination with a cache memory control system. The present invention will be described in connection with a microprocessor based computer system into which the cache memory control system and the memory controller is incorporated. FIGS. 1-7 provide background information to assist in understanding the invention.

Figure 1:
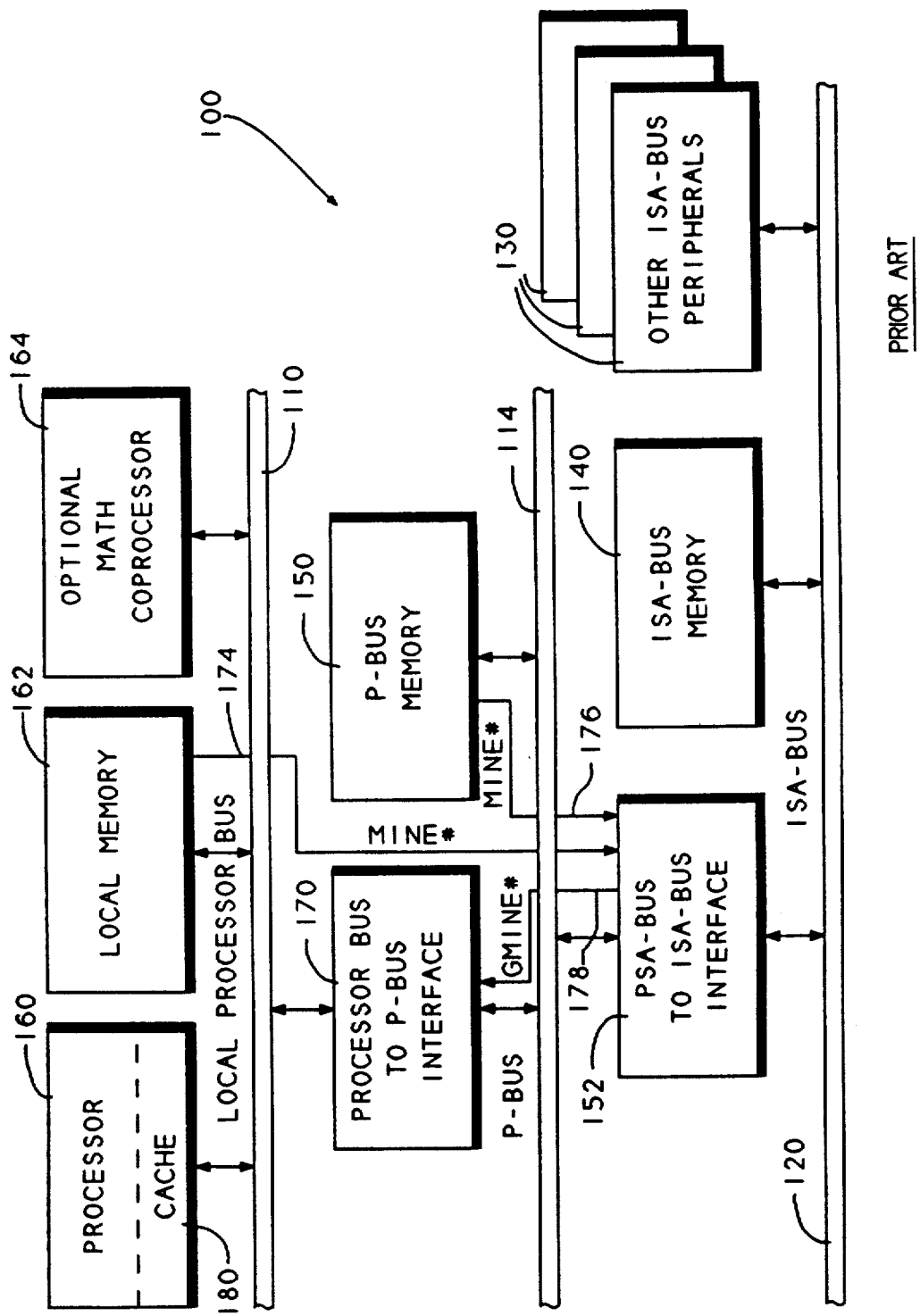
FIG. 1 is a simplified block diagram of an exemplary computer system utilizing an microprocessor in combination with an ISA bus.

FIG. 1 is a simplified block diagram of an ISA compatible computer system 100 into which the present invention may be incorporated. The computer system 100 includes a local processor bus 110, a P-bus 114 and an ISA-bus 120. The ISA-bus 120 is preferably a conventional ISA-bus which can transfer 8 bits or 16 bits of data per transfer operation, or the bus 120 may be an extended industry standard architecture (EISA) bus which includes capabilities for transferring up to 32 bits of data per transfer operation. The operational characteristics of the ISA-bus and the EISA-bus are very well known, and is described, for example, in Edward Solari, "AT BUS DESIGN," Annabooks, 1990, ISBN 0-929392-08-6. Although described herein with respect to the ISA-bus system, it should be understood that the present invention may also be used in connection with other computer systems that utilize a cop back cache system.

The ISA-bus 120 is connected to a plurality of conventional ISA-bus peripheral devices 130, which may include, for example, a hard disk controller, a floppy disk controller, a LAN interface, or the like. The ISA-bus 120 is also connected to a conventional ISA-bus memory 140.

The P-bus 114 is a high speed bus that provides asynchronous communication to a plurality of devices connected to the P-bus 114. For example, a P-bus memory module 150 can be connected to the P-bus 114 to provide additional memory storage. The P-bus 114 is a 32-bit data bus and thus is not limited to 8-bit or 16-bit transfers as on the ISA-bus 120. Typically, the P-bus 114 operates at a substantially higher data rate than the 8 MHz or 10 MHz ISA-bus 120. A P-bus to ISA-bus interface 152 provides an interconnection between the two buses so that the data rate of the P-bus 114 can be greater than the data rate of the ISA-bus 120. Preferably, the P-bus to ISA-bus interface 152 is an asynchronous interface so that the data rate of the P-bus 114 can be varied independently of the data rate of the ISA-bus 120. An asynchronous P-bus to ISA-bus interface 152 is described in commonly owned copending U.S. patent application Ser. No. 433,982, filed on Nov. 9, 1989, which is incorporated herein by reference.

A processor 160 and a local memory 162 are connected directly to the local processor bus 110 and communicate with each other via the local processor bus 110. An optional external math coprocessor 164 can also be connected to the local processor bus 110 as shown. The local processor bus 110 is a synchronous bus that is synchronized to the clock speed of the processor 160, the local memory 162 and the math coprocessor 164. The local processor bus 110 includes a plurality of address bits (the address portion), a plurality of data bits (the data portion) and a plurality of control signals. Since the local processor bus 110 is a synchronous bus, operations on the local processor bus 110 (e.g., communications between the processor 160 and the local memory 162 or the coprocessor 164) can operate without requiring any wait states (wait states are discussed below). The processor 160 communicates with the P-bus memory 150 via a processor bus to P-bus interface 170 which provides handshaking between the local processor bus 110 and the P-bus 114. The processor 160 also communicates with the ISA-bus memory 140 and the ISA-bus peripheral devices 130 via the processor bus to P-bus interface 170 and the P-bus to ISA-bus interface 152. It can be seen that the computer system 100 of FIG. 1 has three levels of processor communication: high speed synchronous communication via the local processor bus 110; high speed asynchronous communication via the P-bus 114; and lower speed asynchronous communication via the ISA-bus 120.

When the processor 160 initiates a bus operation, it provides an address on the local processor bus 110. If the address corresponds to an address allocated to the local memory 162, the local memory 162 recognizes the address and responds With an active BRDY# or RDY# signal (not shown) and transfers the data to the processor 160. The local memory 162 also generates an active MINE# signal on a signal line 174 which is communicated to the P-bus to ISA-bus interface 152. If the address corresponds to the P-bus memory 150, the P-bus memory activates a MINE# signal on a signal line 176, also connected to the P-bus to ISA-bus interface 170. The processor bus to P-bus interface 170 communicates a BRDY# signal generated by the P-bus memory 150 to the processor 160 via the local processor bus 110. Another device, such as an additional memory module (not shown) on the P-bus 114 would activate a MINE# signal if the address corresponds to an address allocated to that device. If an active MINE# signal is received by the P-bus to ISA-bus interface 152 from any of the devices an active GMINE# signal is generated on a signal line 178. The GMINE# signal is communicated to the processor bus to P-bus interface 170. When an active GMINE# signal is generated, the P-bus to ISA-bus interface 152 blocks communications between the local processor bus 110 and the ISA-bus 120. If an active MINE# signal is not received by the P-bus to ISA-bus interface 152 from any of the devices, the P-bus to ISA-bus interface 152 initiates a bus cycle on the ISA-bus 120. By locating the local memory 162 on the local processor bus 110, communications between the processor 160 and the local memory 162 can proceed at the higher data rate of the local processor bus 110, and the data rate only needs to be slowed when the processor 160 needs to communicate with the P-bus memory 150 on the P-bus 114 or needs to communicate with the ISA-bus memory 140 or other peripheral device 130 on the ISA-bus 120.

As set forth above, the processor 160 is preferably an Intel 80486 microprocessor that includes an internal cache memory (CACHE) 180 that communicates with the local processor bus 110. The 80486 microprocessor is described in "i486 TM MICROPROCESSOR," a manual available from Intel Corporation as order number 240440-002, which is incorporated herein by reference. When the processor 160 requests a data from a particular address, the internal cache 180 first determines whether the data from the particular address has been cached. If not, the internal cache 180 reads a line of data (e.g., sixteen bytes) from the local memory 162 or the P-bus memory 150 and stores the new line of data in the internal cache 180. Thereafter, when data from the sixteen-byte line are needed, the data are transferred from the internal cache 180 to the processor 160. As discussed above, when the processor 160 writes to an address that has been cached, the data is stored in the internal cache 180 and is also written to the corresponding address in the local memory 162 or the P-bus memory 150. The ISA-bus memory 140 is not cached since it is accessible by other devices and the data in the ISA-bus memory 140 may be changed without reflecting the change in the corresponding data in the internal cache memory 180.

Although the internal cache memory 180 of the 80486 microprocessor provides significant advantages over no caching, it has been found to be inadequate in some aspects. For example, as discussed above, the 8,192-byte internal cache memory 180 is not sufficiently large for some applications where instructions and data are obtained over a large range of addresses. Further, in many cases a copy-back cache is desirable. The present invention includes an external cache memory system that provides 128 KBytes (131,072 bytes) of data storage. In the preferred embodiment, the external cache memory system is a copy-back cache memory system.

Figure 2:
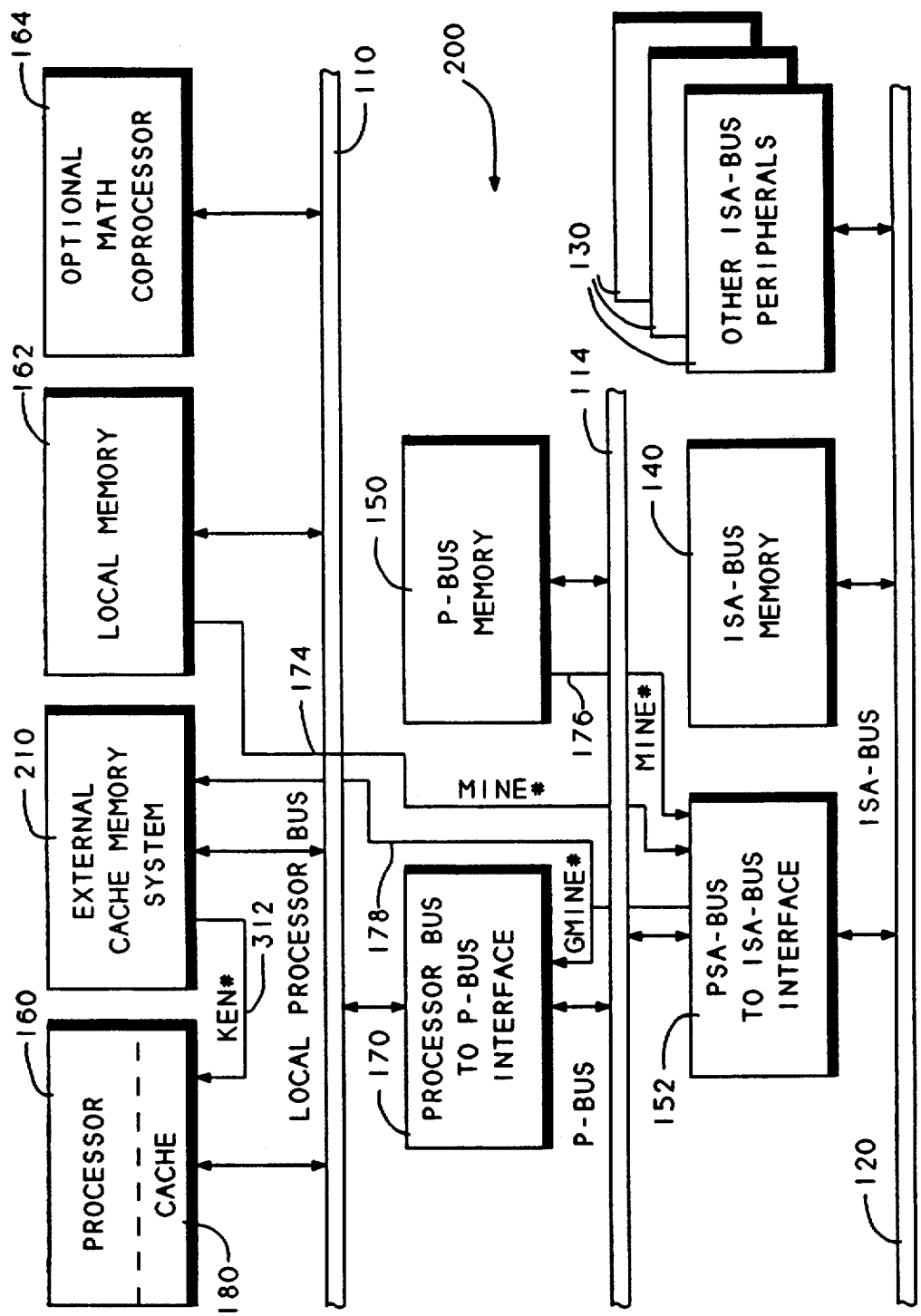
FIG. 2 is a simplified block diagram of an exemplary computer system into which the external cache memory system of the present invention is incorporated.

The present invention is shown in FIG. 2 as part of a computer system 200 which includes the elements described above for the computer system 100 and which are numbered with like numbers. The present invention includes an external cache memory system 210 (shown in more detail in FIG. 3) which includes a cache memory controller 212 and a cache memory 214. The cache memory system 210 is connected to the processor 160 via the local processor bus 110. Preferably, the cache memory 214 has a storage capacity of 128 KBytes.

Figure 3:
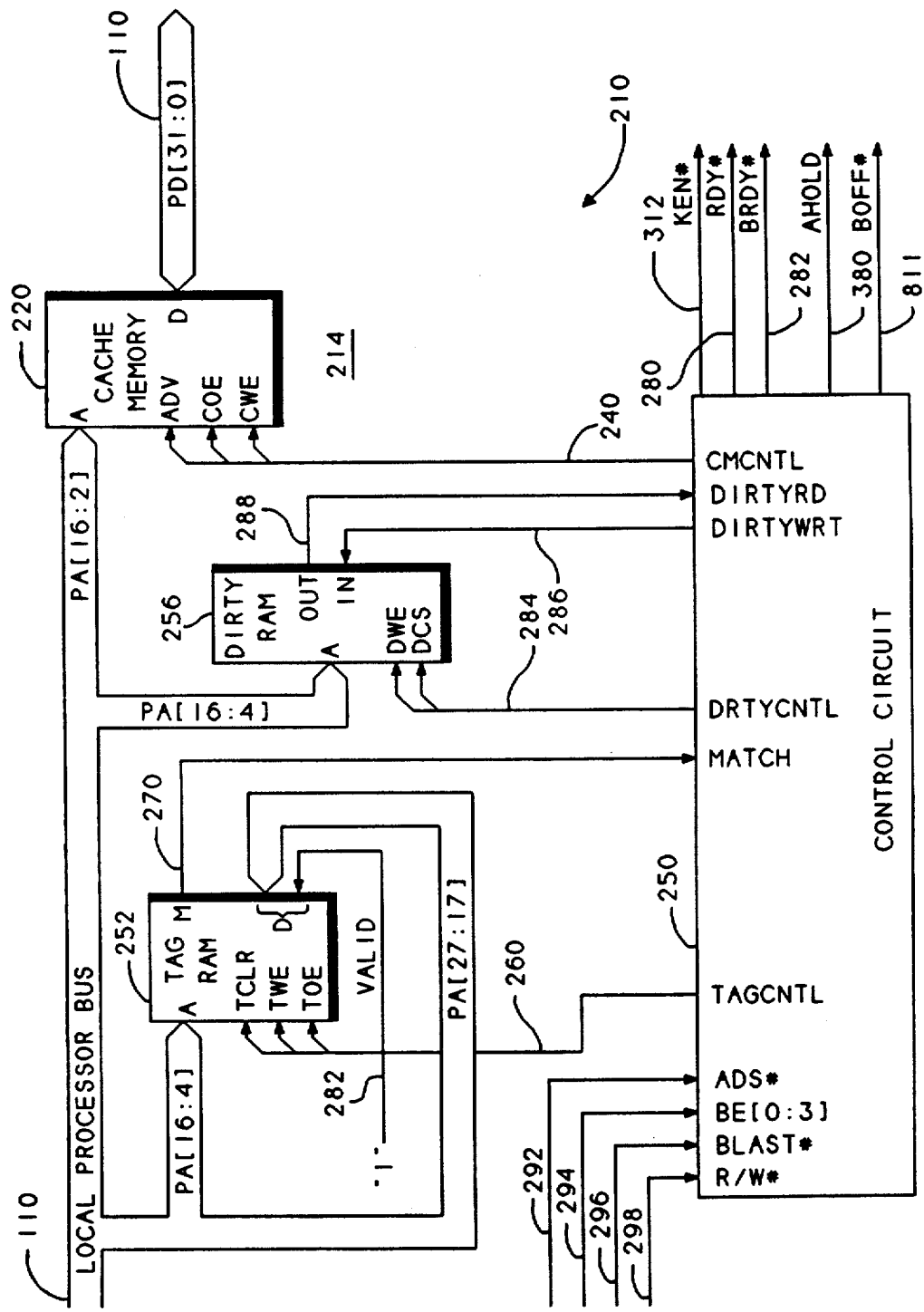
FIG. 3 is a block diagram of the external cache memory system of the present invention.

A block diagram of the cache memory system 210 is illustrated in FIG. 3. As illustrated, the cache memory 214 comprises a bank of static random access memory 220. The bank of memory 220 comprises a 128 KBytes of data storage organized as 32,768 double words by 32 bits per double word. In addition, four parity bits are provided. In the preferred embodiment, the bank of memory comprises four MCM62486 32K×9-bit synchronous static RAMs available from Motorola Inc. The data inputs and outputs are bidirectional and are connected to the data portion of the local processor bus 110. The bank of memory 220 has a 14-nanosecond access time.

The addresses for the bank of memory 220 comprise bits 16-2 (i.e., PA[16:2]) of the address portion of the local processor bus 110. (As used herein, bit 0 is the least significant bit of address and bit 31 is the most significant bit of the address bus).

The cache memory controller 212 also provides a cache write enable (CWE) signal, an cache output enable (COE) signal and a burst address advance (ADV) signal to the memory bank 220 on a set of control lines 240. When the write enable control signal is activated by the cache memory controller 212, data from the local processor bus 110 is written into the memory bank 220 at the address on the local processor bus 230. The data is provided by the data portion (PD[31:0]) of the local processor bus 110 and may be data from the processor 160, the local memory 162 or the P-bus memory 150. When an output enable control signal is activated by the cache memory controller 212, data from the memory bank 220 at the address on the local processor bus 230 is enabled onto the local processor bus 110. The burst advance signal is provided to cause the memory bank 220 to automatically output four 32-bit double words of data onto the local processor bus so that an entire line of data is provided to the internal cache memory 180 of the processor 160 or to the local memory 160 or P-bus memory 150. The burst advance signal is activated after each activation of the BRDY# signal.

The cache memory controller 212 comprises a control circuit 250 which advantageously comprises a plurality of programmable gate arrays (not shown); a tag RAM 252; and a DIRTY RAM 256.

The control circuit 250 generates a tag RAM output enable signal (TOE), a tag RAM write enable signal (TWE) and a tag RAM clear signal (TCLR) which are provided as inputs to the tag RAM 252 on a set of tag control (TAGCNTL) signal lines 260. In addition, thirteen address bits (PA[16:4]) from the local processor bus 110 are provided as address inputs to the tag RAM 252. Eleven address bits (PA[27:17]) from the local processor bus 110 are provided as data inputs to the tag RAM 252. The tag RAM 252 preferably comprises three IDT6178 Cache tag RAM circuits commercially available from Integrated Device Technology, Inc. Each circuit is a 4,092-word by 4-bit RAM that includes an internal comparator. When an address is applied to the address inputs, each circuit compares the data stored at that address with data on the data input, and, if the data matches, provides an active match output within 15 nanoseconds. The match output from the tag RAM 252 is provided as a MATCH input to the control circuit 250 on a signal line 270. When the match output of a tag RAM 252 is active, the address applied to the data inputs to the tag RAM matches the data stored in the tag RAM.

The operation of the tag RAM 252 in controlling the cache memory is well-known to the art and will be briefly described. Basically, when data is cached in the memory bank 220, the data comprises four 32-bit double words that are stored in four consecutive addresses of the memory bank 220. The four 32-bit double words are referred to as a "line". The least significant bits of the address from the local processor bus (bits 1 and 0) are not used since they define the four bytes within a double word, and data is stored in the memory bank 220 on word boundaries. The control circuit 250 controls the sequential storing of double words in the memory bank 220 by activating the burst advance signal, as discussed above. The starting address for the line stored in the memory bank 220 is determined by the address bits PA[16:4] on the local processor bus 110. Since the addresses to the memory bank 220 repeat every 32,768 double words, only a line of data from the local memory 162 having the identical address information in bits 16-4 can be copied into the memory bank 220. The tag RAM 252 provides the information that determines the origin of the current line of data stored in the memory bank 220. When a new line of data is written into the memory bank 220, the control circuit 250 activates the tag RAM write enable signal TWE to cause address bits PA[27:17] of the current address on the local processor bus 110 to be written into the tag RAM 252.

When a new address is applied to the processor bus 110 during a subsequent cycle, address bits PA[27:17] of the local processor bus 110 are applied to the data inputs of the tag RAM 252 and address bits PA[16:4] are applied to the address inputs of the tag RAM 252. If the applied address bits PA[27:17] match the stored address bits, then the line of data stored in the memory bank 220 are from the currently accessed address. When the control circuit 250 detects the match, it enables data from the memory bank 220 onto the data portion of the local processor bus 110. The control circuit 250 also immediately enables a BRDY# output signal on a line 280 which is connected to the processor 160. (In a non-burst mode, the control circuit 250 can activate a RDY# signal on a line 282. Only the burst mode will be discussed herein.) Since the addresses have already been applied to the address inputs of the memory bank 220, the 14-nanosecond access time of the static RAMs within the memory bank 220 will have been satisfied and the data can be immediately enabled onto the local processor bus 110. Thus, if there is a hit, the cache memory system 210 can respond sufficiently fast with the data and the active BRDY# signal so that no wait states need to be added by the processor 160.

If the stored address bits in the tag RAM 252 and the applied address bits do not match, then the line of data stored in the memory bank 220 must be replaced with a new line of data from the local memory 162 or the P-bus memory 150. The control circuit 250 does not generate the BRDY# signal in this case. Instead, the BRDY# signal is generated by the local memory 162 or the P-bus memory 150. When the data is read from the local memory 162, it is transferred to the processor 160 and is also stored in the memory bank 220.

The tag RAM 252 is organized as 4,192 words by 12 bits. Eleven of the 12 bits in each word are used to store the tag address, as discussed above. The twelfth bit is used to store a VALID flag to indicate that corresponding tag address is valid. When the tag RAM 252 is initialized, or reinitialized, the tag clear signal is activated to clear all the data in the tag RAM 252 to zeroes. The VALID flag is tied to a logical "1" signal (e.g., a pullup resistor to +5 volts). Thus, when a tag address is written into a location in the tag RAM 252, a logical "1" will be written into the twelfth bit position. Later, when an address in the tag RAM 252 is accessed, the data in the twelfth bit position will be compared to the logical "1" on the data input. If the stored bit is a "1", and the remaining bits compare correctly, then a match will occur; otherwise, if the location in the tag RAM 252 has not been rewritten since last initialized, the original zero written into the twelfth bit position will not compare with the logical "1" on the input even if the remaining eleven bits do compare (e.g., all zeroes on the data inputs comparing with the initialized all zeroes).

The dirty RAM 256 is used to indicate whether a line of data stored in the memory bank 220 has had new data written into it by the processor 160 since the line of data was retrieved from the local memory 162 or the P-bus memory 150; that is, whether or not the line of data is "dirty". The same address inputs (i.e., local processor bus addresses PA[16:4]) are applied to the dirty RAM 256 as are applied to the tag RAM 252. When the processor 160 writes data into the memory bank 220, the dirty bit is set in the currently addressed location in the dirty RAM 256. Thereafter, when an address on the local processor bus 110 results in no match being found by the tag RAM 252 (e.g., address bits PA[27:17] do not correspond to the address bits stored in the tag RAM 252 at the location determined by the address bits PA[16:4]), then a new line of data must be transferred from the local memory 162 or the P-bus memory 150 to the memory bank 220. The control circuit 250 looks at the dirty bit output from the dirty RAM 256 and determines that the bit is set to indicate that the line of data stored in the memory bank 220 has been modified by the processor 160 and must be stored in the corresponding location in the local memory 162 or the P-bus memory 150 before a new line of data is retrieved from the local memory 162 or the P-bus memory 150. The control circuit 250 controls the dirty RAM 256 via a dirty ram write enable signal (DWE) and a dirty ram chip select signal (DCS) on a set of dirty ram control (DRTYCNTL) lines 284.

The control circuit 250 further includes as inputs the ADS# signal on a line 292, a set of byte enable signals BE[0:3] on a set of lines 294, a BLAST# signal (which the microprocessor 160 activates to indicate that the next BRDY# signal will be the last in a burst cycle) on a line 296, and a read/write control signal (WE#) on a line 298.

The above-described operation of the cache memory system 210 is conventional and is well-known. The improvement in the present invention lies in the operation of the local memory 162 in rapidly performing copy back/line fill operations in cooperation with the cache memory system 210. Before proceeding with a detailed description of the present invention, it is helpful to refer to a set of bus timing diagrams in FIG. 4 for an exemplary processor read cycle in the burst mode.

Figure 4:
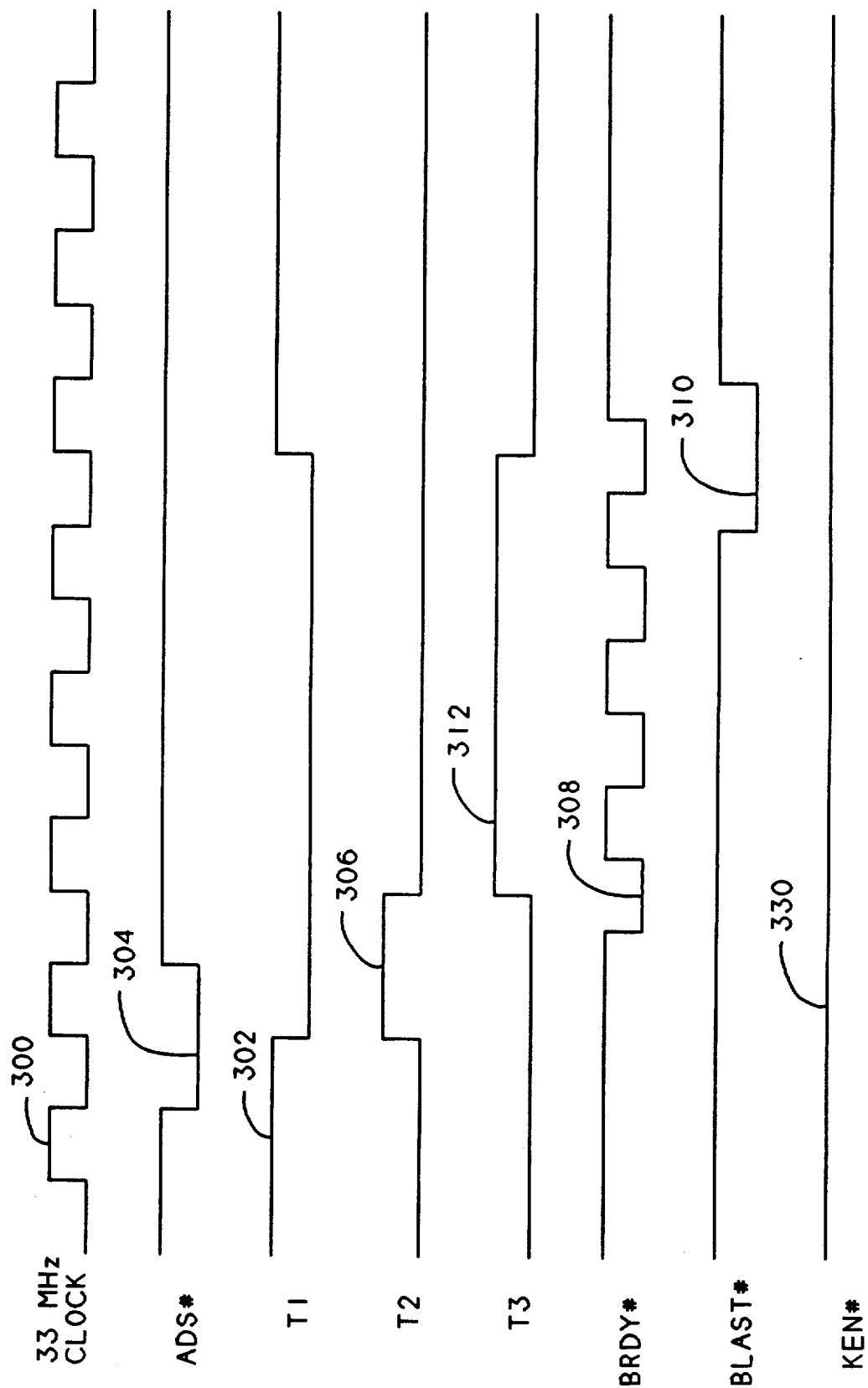
FIG. 4 illustrates timing diagrams of a non-cached transfer of data from a memory to the processor of FIG. 2 without requiring additional wait states.

As illustrated in FIG. 4, the processor 160 is controlled by a 33 MHz processor clock signal (shown in a timing diagram 300) having a cycle time of approximately 30 nanoseconds. During a time period designated as T1 (illustrated by an active high signal in a timing diagram 302), the processor 160 activates the ADS# signal (shown as an active low signal in a timing diagram 304) to indicate to devices on the local processor bus 110 that the address and cycle definition information on the bus 110 is valid. (The time period T1 may be as short as one 30-nanosecond clock cycle as shown in FIG. 4, or it may comprise multiple clock cycles.) The time period T1 ends at the end of the processor cycle in which the active ADS# signal occurs. The time period T1 is followed by a time period T2 (shown as an active high signal in a timing diagram 306) which comprises one processor clock cycle. If the addressed device responds by activating the BRDY# signal (shown as an active low signal in a timing diagram 308) or the RDY# signal (not shown) by the end of the T2 time period, the processor 160 will accept data from the device at the end of the T2 time period. In the burst mode described herein, four double words of data are transferred from the cache memory system 210 or the local memory 162, for example, during each burst read cycle. When the addressed device drives the BRDY# signal active as shown, the processor 160 recognizes that additional double words will be following, and will wait for the next three active BRDY# signals, as shown. Upon receipt of the third active BRDY# signal, the processor 160 activates the BLAST# signal (diagram 310) to indicate that the following double word (i.e., the fourth double word) will be the last double word accepted during this transfer. The processor 160 can activate the BLAST# signal prior to the first, second or third active BRDY# signal to terminate the burst read cycle after the first, second or third double word transfer, respectively. The T2 time period is followed by a T3 time period (diagram 312) which continues until the fourth active BRDY# signal. (It should be noted that Intel, the manufacturer of the 80486 microprocessor, refers to the additional time period as an additional T2 time period; however, as used herein, only the first time period following the T1 time period is referred to a T2 time period.) The T3 time period is followed by the T1 time period which lasts until the microprocessor again activates the ADS# signal.

The timing diagrams in FIG. 4 illustrate zero-wait state cycles which means that the processor 160 is operating without pausing. That is, the external cache memory system 210 or the local memory 162 is able to provide data to the processor 160 by the end of the T2 time period and then every cycle (i.e., every 30 nanoseconds) thereafter until the end of the burst cycle.

Figure 5:
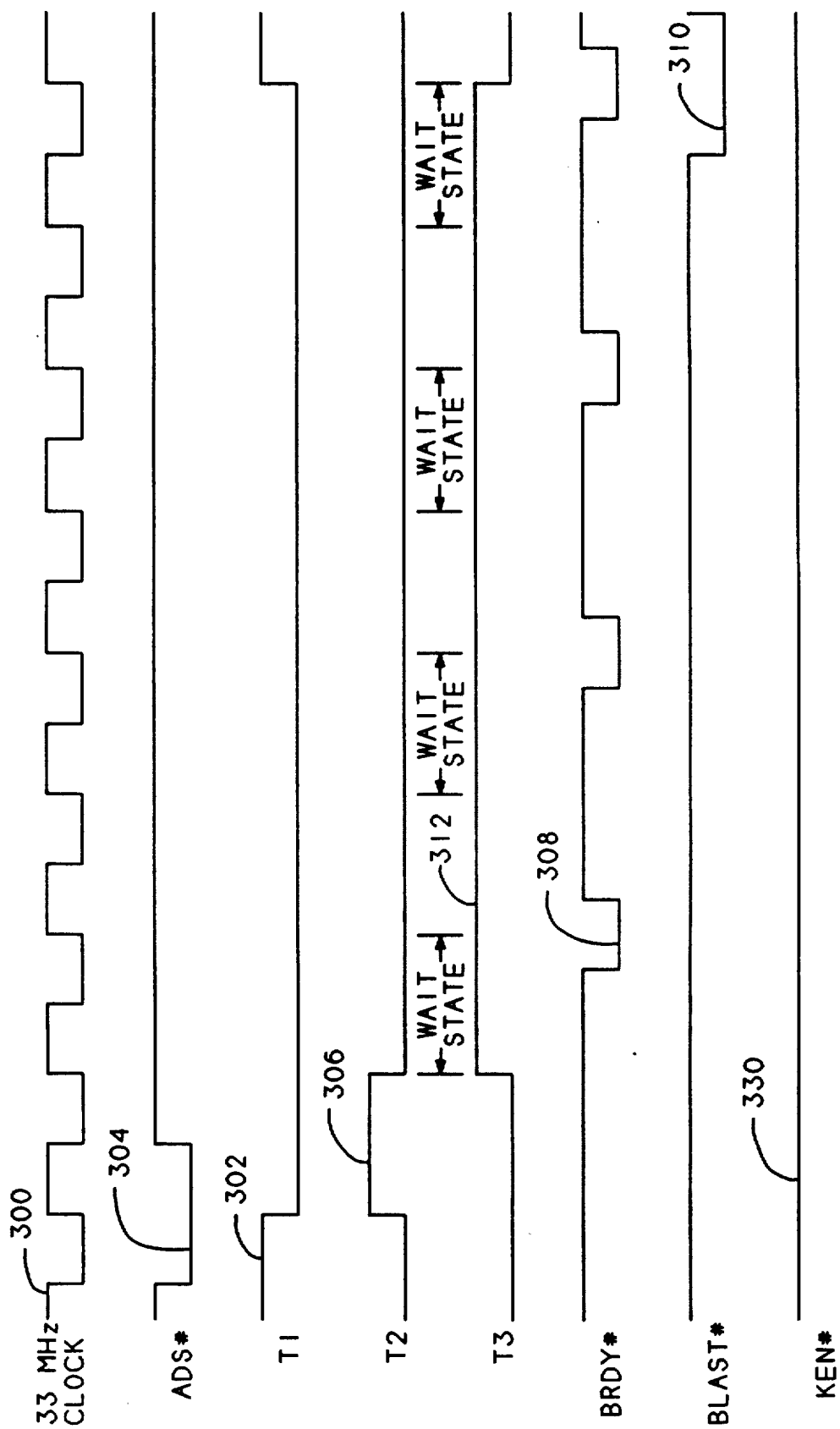
FIG. 5 illustrates timing diagrams of a non-cached transfer of data from a memory to the processor of FIG. 2 in which an additional wait state is required.

Referring now to FIG. 5, the timing diagrams for a device that requires one-wait state in which to respond are illustrated. The timing diagrams are numbered as before. As illustrated, the device does not generate an active BRDY# signal by the end of the T2 time period as before and thus the processor 160 does not input the data. The time period T3 begins at the end of the time period T2, as before, however, the BRDY# signal is not generated until the end of the first processor clock cycle in the T3 time period. The extra clock cycle required to generate the active BRDY# signal is referred to as a wait state. Slower devices may further delay the generation of the BRDY# signal by additional clock cycles. Again, assuming a burst mode transfer, the external device (e.g., the P-bus memory 150) provides three additional BRDY# signals for each of the next double words of data. When the last BRDY# is generated, the next T1 time period begins.

The cache memory system 210 generates a cache enable (KEN#) signal on a line 314 that indicates to the processor 160 that the data being read from the external cache memory system 210, the local memory 162 or the P-bus memory 150 should be cached in the internal cache memory 180 for future use. Referring to FIGS. 4 and 5, it can be seen that the KEN# signal (diagram 316) is inactive at all times to indicate to the processor 160 that the data to be communicated to the processor 160 is not cacheable. If an external device (e.g., the external cache memory system 210) wants the data transferred to the processor 160 to be cached in the internal cache memory 180, the external device must activate the KEN# signal at least 5 nanoseconds before the end of the processor clock cycle in which the ADS# signal is activated by the processor 160. This is illustrated in FIGS. 6 and 7, which correspond to FIGS. 4 and 5, respectively, for cacheable data.

The ADS# signal generated by the processor 160 is not guaranteed to be active until approximately 16 nanoseconds after the beginning of the T1 time period. Thus, the state of the KEN# signal must be determined within approximately 9 nanoseconds after the ADS# signal is activated in order to meet the 5-nanosecond setup time prior to the beginning of the T2 time period. Otherwise, an additional wait state would have to be inserted by not activating the BRDY# signal before the end of the following T2 time period as was illustrated in FIG. 5. Since it is desirable to respond without inserting additional wait states whenever possible, the cache memory system 210 rapidly determines whether KEN# should be activated for a zero-wait state device so that the zero-wait state devices can generate the BRDY# signal before the end of the next T2 cycle.

At the present time, only two devices are generally available that can respond without inserting any wait states. The first device is the optional external math coprocessor 162 (FIG. 2), such as the Weitek 4167 coprocessor. The second device is the external cache memory system 210 described above. The data read from the coprocessor 164 should not be cached by the internal cache memory 180, and data read from the external cache memory system 210 should be cached by the internal cache memory 180. Thus, the cache memory system 210 distinguishes between an access to the math coprocessor and an access to the external cache memory system 210 and deactivates the KEN# signal if the math coprocessor 164 is selected. If the coprocessor 164 is not selected, the KEN# signal is activated before the end of the T1 cycle. Thus, if the external cache memory 210 is selected and there is a hit, as described above, the external cache memory system 210 can activate the BRDY# signal before the end of the following T2 cycle and transfer data to the processor 160 without requiring the processor 160 to insert any wait states. Since the KEN# signal has been applied, the data transferred from the external cache memory system 210 will be cached by the internal cache 180. The KEN# signal must be active one clock cycle before the first active BRDY# signal to cause the internal cache 180 to store the input data, and the KEN# signal must again be active one clock cycle prior to the fourth (i.e., last) BRDY# signal at the end of the burst cycle as shown at 332 in FIG. 6 so that internal cache memory 180 will mark the cached data as valid. As further shown in FIG. 6 by the dashed line portion of the KEN# signal, it is not necessary that the KEN# signal remain active throughout the four double word burst.

Figure 6:
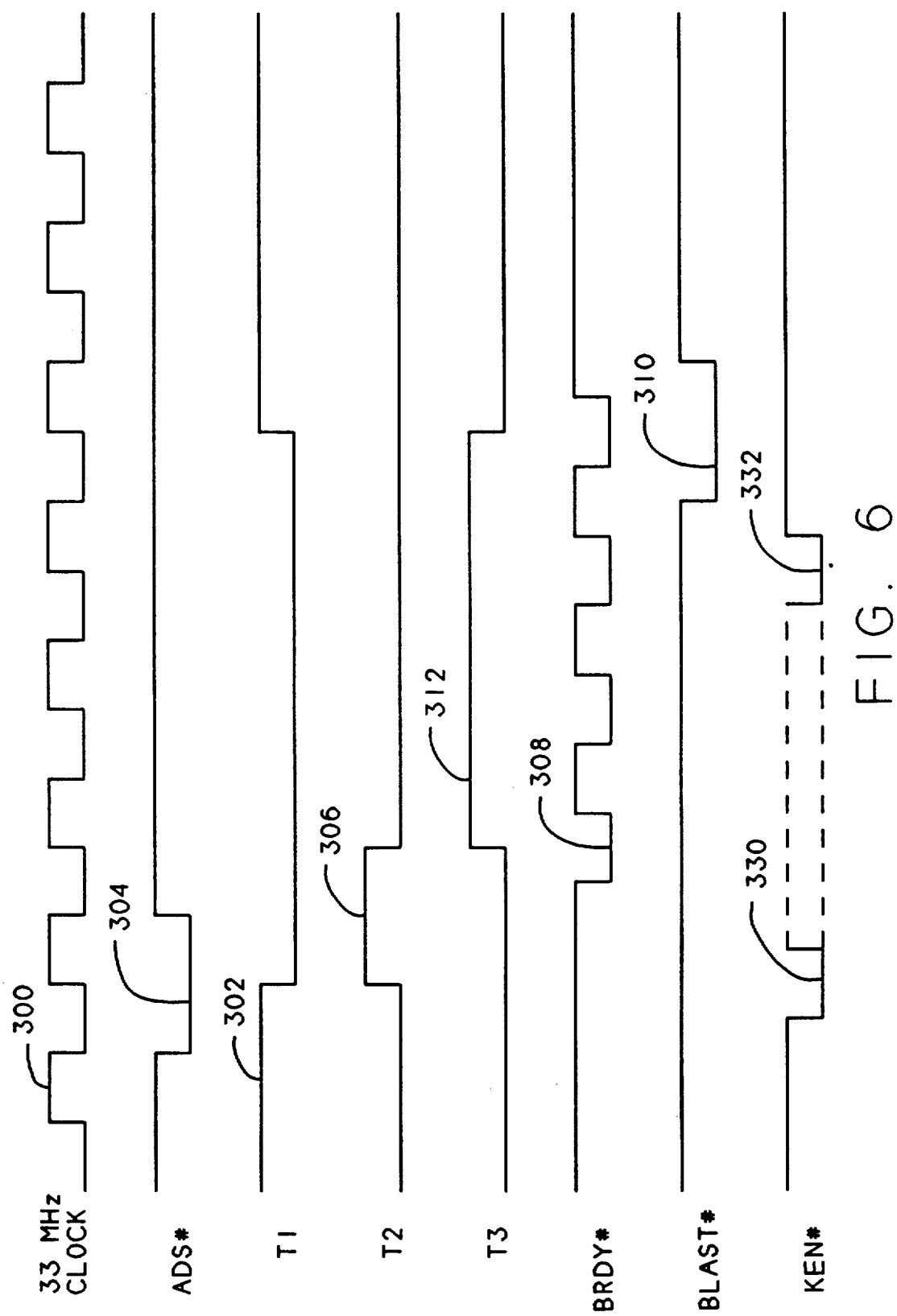
FIG. 6 illustrates timing diagrams similar to the timing diagrams of FIG. 4 in which the KEN# signal is activated to cause the memory data to be cached in the internal cache memory of the processor of FIG. 2.
Figure 7:
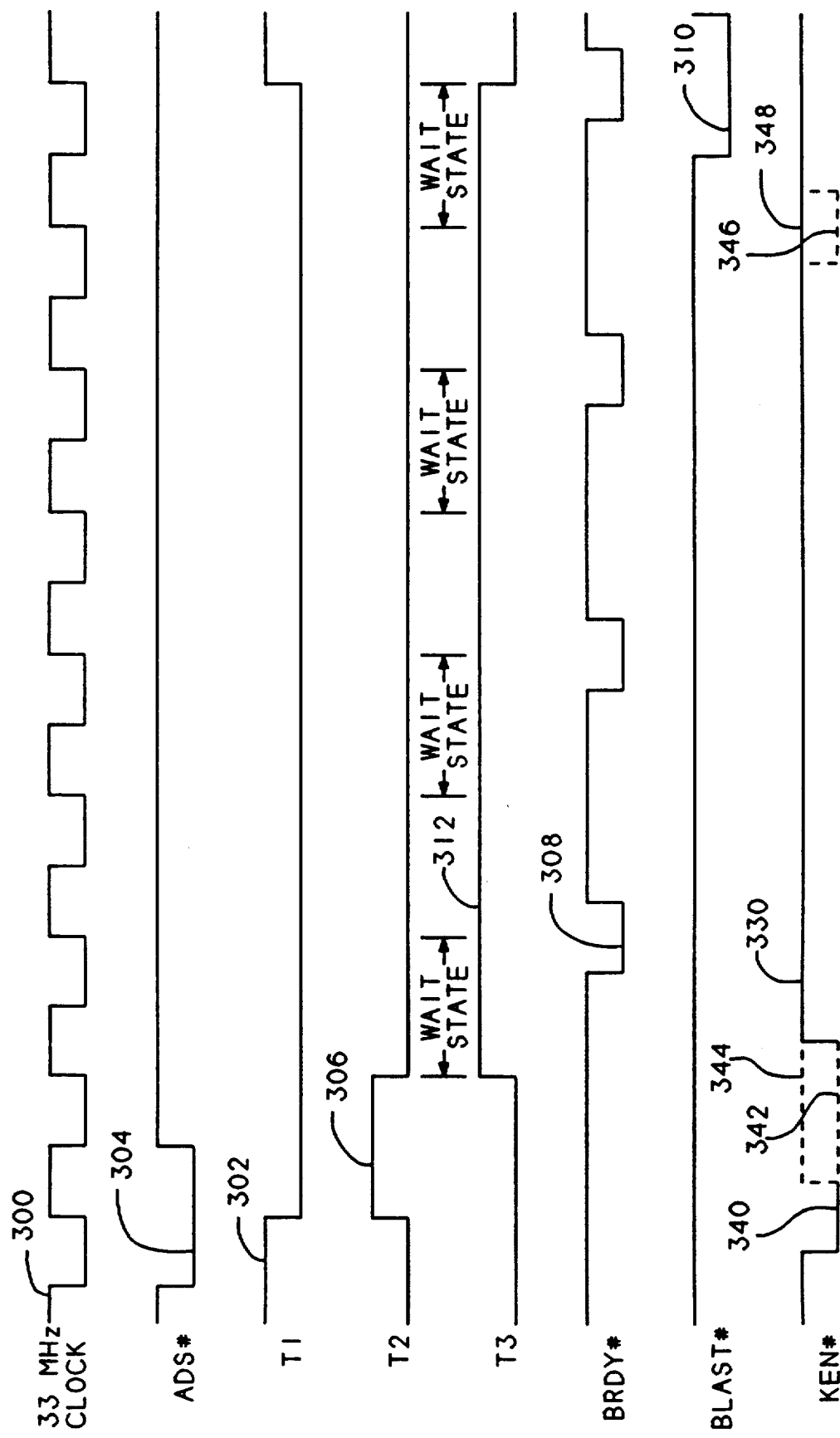
FIG. 7 illustrates timing diagrams similar to the timing diagrams of FIG. 5 in which the KEN# signal is activated to cause the memory data to be cached in the internal cache memory of the processor of FIG. 2.

If the address on the local processor bus 110 during the T1 cycle is an address that has its data cached in the external cache memory system 210, the external cache memory system 210 will respond with an active BRDY# signal before the end of the T2 time period, as illustrated in FIG. 6, and the processor 160 will continue without inserting a wait state. If the address is not a cached address such that the cache memory system 210 cannot respond immediately or if the address is not a cacheable local memory address, the cache memory system 210 does not generate an active BRDY# signal before the end of the T2 period. Thus, the processor 160 will automatically insert wait states and the T3 time period will be extended, as illustrated in FIG. 7.

Continuing to refer to FIG. 7, the KEN# signal is activated before the end of the T1 time period (shown at 340) in case the address is directed to an address cached within the external cache memory system 210. However, the processor 160 does not automatically cache the incoming data in response to the active KEN# signal unless it is followed by an active BRDY# signal in the next clock cycle. Thus, if the cache memory controller 212 determines that the address is cacheable but that the data must come from the slower local memory 162, for example, it maintains the KEN# signal in its active state (or reactivates the KEN# signal a second time) as represented by the lowermost dashed lines at 342 on the next clock cycle before the BRDY# signal is activated at the end of the first wait state in the time period T3.

On the other hand, if the cache memory controller 212 determines that the address is a non-cacheable address, such as an address to the ISA-bus memory 140, the cache memory controller 212 does not activate the KEN# signal during the clock cycle before returning an active BRDY# signal. This is illustrated by an inactive high KEN# signal, represented by the uppermost dashed lines at 344 in FIG. 7. Thus, although the KEN# signal was initially activated as shown at 340, the processor 160 does not begin caching the data in its internal cache memory 180 since the KEN# signal is not active one clock cycle before the active BRDY# signal.

As in FIG. 6, the KEN# signal must be again active one clock cycle before the last active BRDY# signal in the cycle as represented by the lowermost dashed lines at 346 in FIG. 7 if the data is to be validated in the internal cache memory 180. Otherwise, the KEN# signal is held inactive as illustrated by the uppermost dashed lines at 348.

DESCRIPTION OF THE MEMORY CONTROLLER OF THE PRESENT INVENTION

In order to understand the solution provided by the present invention, it is helpful to briefly review the operation of exemplary dynamic memory circuits. Basically, dynamic memories are organized as an array of cells accessed by row addresses and column addresses. An access to the array begins by applying a row address to the array which causes each of the cells in one selected row to provide an output responsive to the data stored therein. The outputs from all the cells in the selected row comprise the columns of the array. A column address is applied to a decoder connected to the outputs of the array to cause one of the column outputs to be selected for a read access. For a write access, data is applied to the selected column to cause the applied data to be stored in the cell in the selected column of the selected row.

Figure 8:
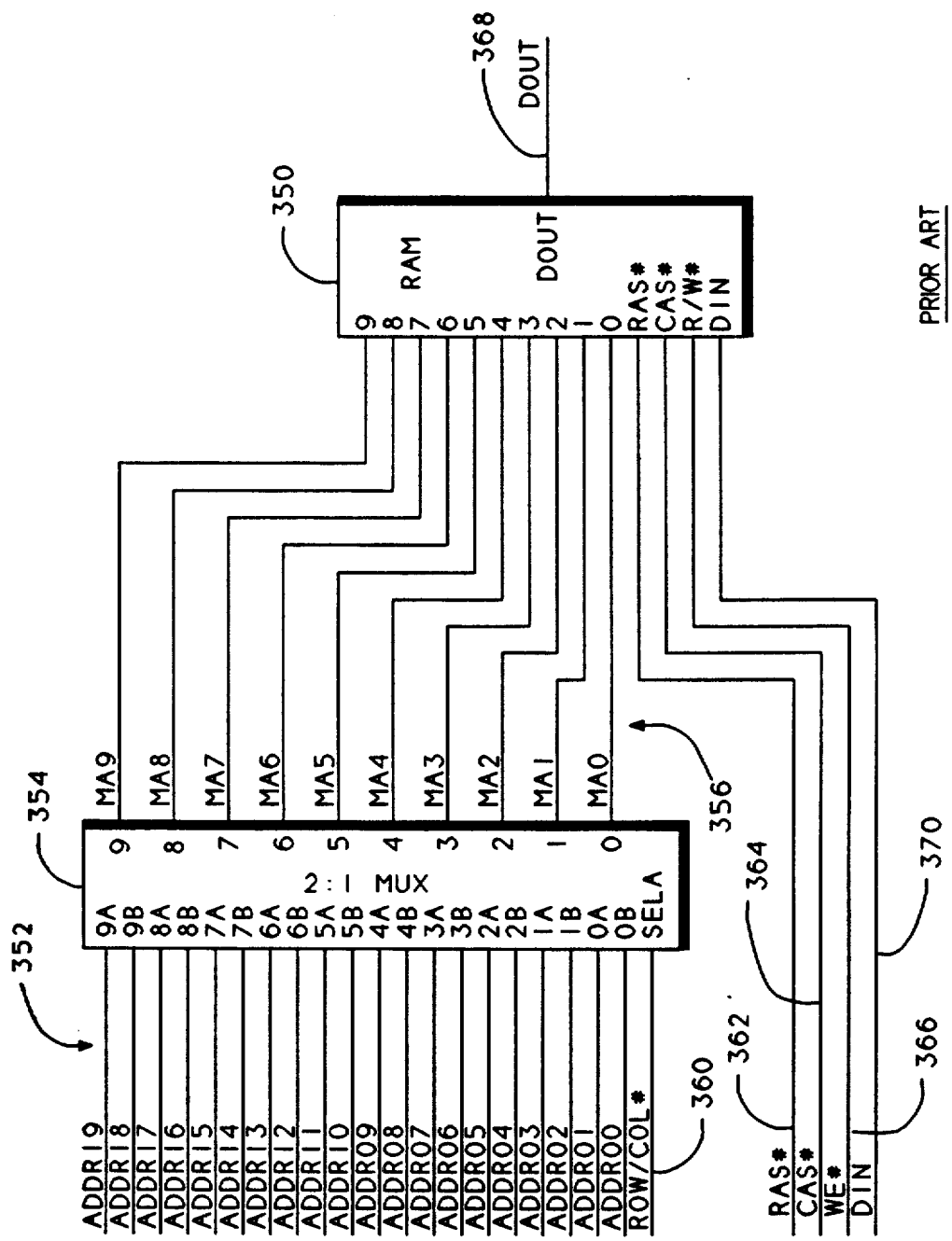
FIG. 8 is a block diagram of an exemplary dynamic RAM integrated circuit along with a multiplexer for selectively gating row addresses and column addresses to the dynamic RAM.
Figure 9:
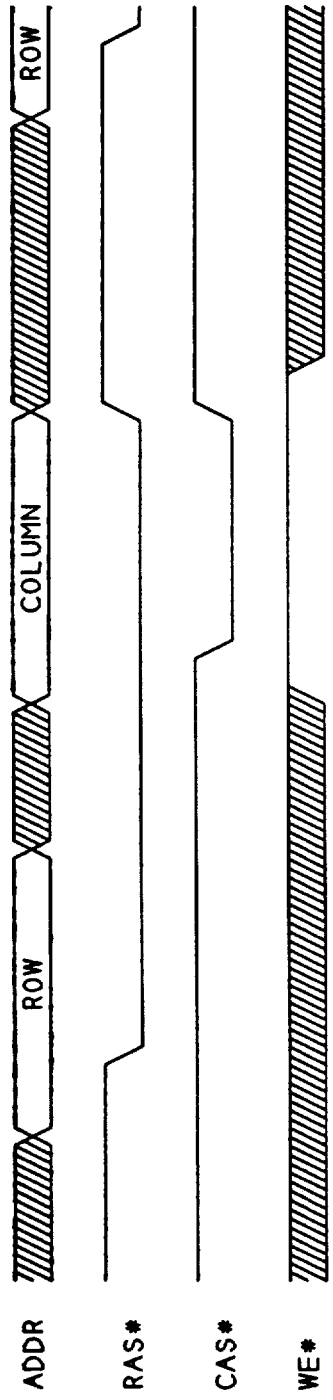
FIG. 9 is a set of timing diagrams for an exemplary read cycle for the dynamic RAM circuit of FIG. 8.
Figure 10:
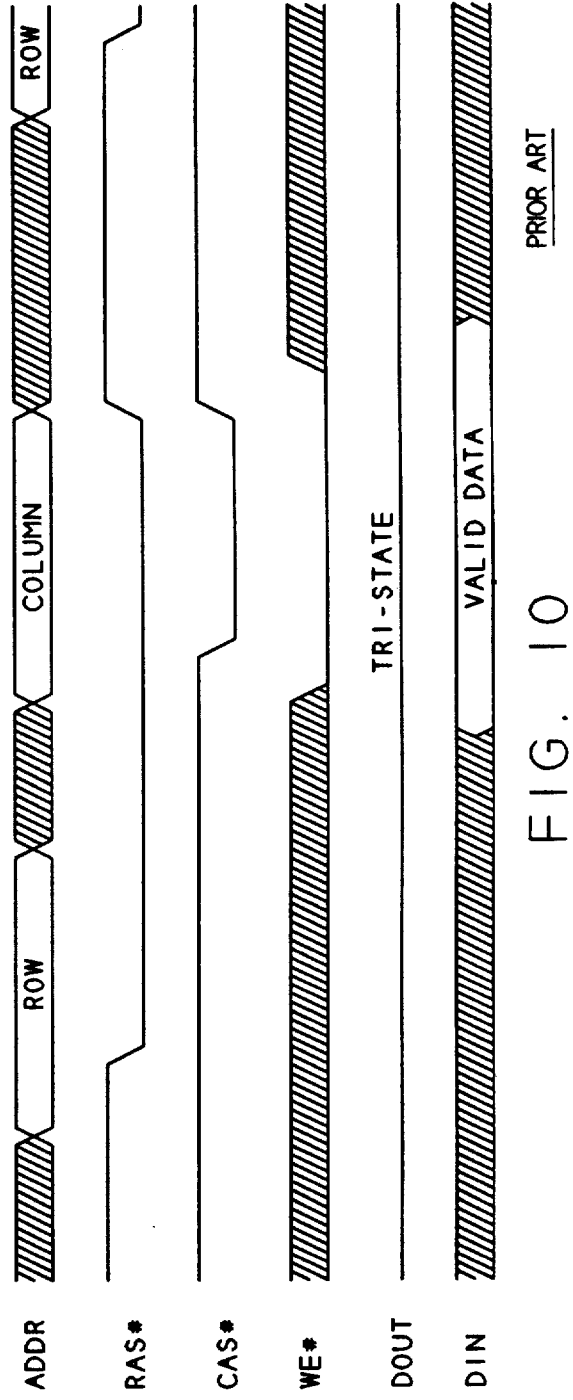
FIG. 10 is a set of timing diagrams for an exemplary write cycle the dynamic RAM circuit of FIG. 8.

As illustrated in FIGS. 8, 9 and 10 for an exemplary 1M×1 dynamic RAM 350, twenty address lines (ADDR19-ADDR00) 352 are multiplexed by a multiplexer (MUX) 354 to provide ten address lines 356 that are provided to the ten address inputs of the RAM 350 as multiplexed row addresses and column addresses. When the most significant addresses (ADDR-19-ADDR10) are selected by activating a ROW/-COL# signal line 360 connected the select input (S) of the multiplexer 354, the row addresses are gated into the RAM 350 when a row address select (RAS#) signal on a line 362 is activated. Thereafter, the ROW/COL# signal is deactivated to select the least significant addresses (ADDR9-ADDR0), and a column address select (CAS#) signal on a line 364 is activated. If a write enable (WE#) signal on a line 366 is not active when the CAS# signal is activated, as illustrated in FIG. 9, then after the RAM access time, the data at the addressed location of the RAM 350 is available as a valid data output (DOUT) signal on a line 368. On the other hand, if the WE# signal line is active low when the CAS# signal is activated, as illustrated in FIG. 10, then valid input data (DIN) on a signal line 370 is stored in the addressed location of the RAM 350. During a write to the RAM 350, the DOUT signal line is typically in a high impedance (i.e., tri-state or open) condition so that the DOUT and DIN signal lines can be electrically interconnected, if desired.

As illustrated in FIGS. 9 and 10, when the row address to the RAM 350 is changed, the RAS# signal line must be first deactivated and then reactivated when the new row address is on the address lines 352. The RAS# signal line must be deactivated for a minimum amount of time, referred to as the RAS precharge time, and then must be active for a minimum time, referred to as the row access time, before the read data is available on the data output (DOUT). Similarly, if the column address to the RAM 350 is changed, the CAS# signal must be deactivated for a minimum amount of time, referred to as the CAS precharge time, and then must be active for a minimum time, referred to as the column access time. Typically, the minimum RAS precharge time and the minimum RAS access time are substantially larger than the minimum CAS precharge time and the CAS access time, respectively, so that the memory cycle time is generally determined by the RAS precharge and access times.

With the foregoing information as background, it should be understood that when the processor 160 initiates a read access to an address cached within the external cache memory system 210, the external cache memory system 210 responds by activating the KEN# signal. Thereafter, the cache memory system 210 communicates data to the local processor bus 110 and activates the BRDY# signal to cause the processor 160 to input the data into the internal cache memory 180. The BRDY# signal is activated up to four times to cause the four double words of data in a line to be input to the internal cache memory 180.

When the processor 160 executes a data write to the local processor bus 110 with an address cached in the external cache memory system 210, the external cache memory system 210 stores the data in the location in the cache memory 214 corresponding to the address on the local processor bus 110. Furthermore, as set forth above, the dirty bit in the corresponding address in the dirty RAM 256 is set to indicate that the data in the cache memory 214 has been modified.

When the processor 160 initiates a read or write access to the local processor bus 110 to a cacheable address that is not currently cached in the external cache memory system 210 (i.e., there is a cache miss), the cache memory system 210 must initiate a read access to the local memory 162, for example, to bring in a line of data to the cache memory 214. The address range of the line of data includes the requested address. Thus, the external cache memory system 210 does not activate the BRDY# signal as discussed above. Rather, the external cache memory system 210 first examines the dirty bit out of the dirty RAM 256 and determines whether the data currently stored in the addressed location in the cache memory 214 has been modified since it was stored in the cache memory 214.

First, assuming that the dirty bit is not active, the data currently in the accessed location in the cache memory 214 corresponds to the data in the local memory 162 and does not have to be saved. Thus, the local memory 162 need only access the line of data to be transferred to the external cache memory 214 and to the processor 160. The local memory 162 initiates a read cycle (to be described in more detail below), and transfers the four double words to the cache memory 214 via the local processor bus 110. When the local memory 162 responds with a BRDY# signal to indicate that the data is on the local processor bus 110, the external cache memory system 210 stores the data in cache memory 214 and stores the most significant address bits in the tag RAM 252. Since the caching is accomplished a line at a time, four BRDY# signals are activated in succession to transfer four double words to the external cache memory system 210.

If the access from the processor 160 was a read access, the four double words are transferred to the internal cache memory 180. As discussed above, the processor 160 can interrupt the four double word transfer after the first, second or third double word by activating the BLAST# signal prior to the receipt of the last double word that it wants to receive. Although the processor 160 may only want one, two or three double words, the external cache memory system 210 fills an entire line at a time and thus always transfers four double words from the local memory. Thus, the external cache memory system 210 activates the conventional address hold (AHOLD) signal on a line 380 (FIG. 3) to the processor 160 to prevent the processor 160 from utilizing the local processor bus 110 until the four double words have been transferred from the local memory 162 to the cache memory 214.

If the access from the processor 160 was a write access, then the data is not transferred from the local memory 162 to the processor 160. Rather, the four double words of data from the local memory 162 are stored in the cache memory 214. However, as the data is transferred into the cache memory 214 from the local memory 162, the data from the processor 160 is substituted for the first double word from the local memory 160 or for a portion (e.g., byte or word) of the first double word so that the data in the cache memory 214 includes the data written from the processor 160. Thus, the line of data in the cache memory 214 is immediately marked as "dirty."

If the dirty bit in the dirty RAM 256 is active on a read or write access that misses in the external cache memory system 210, then the line of data in the cache memory 214 does not correspond to the data in the local memory 162. Thus, the external cache memory system 210 must store the current line of data in the local memory 162 to make the address location in the cache memory 214 available for new data from the local memory 162. Thereafter, new data is retrieved from the local memory 162 and stored in the cache memory 214 as well as being transferred to the processor 160.

As discussed above, the storing of the dirty data in the local memory 162 is generally time consuming and results in delaying the data transferred to the processor 160 such that the processor 160 must wait until the line of data has been transferred from the cache memory 214 to the local memory 162 before it receives the requested data. In particular, a first initial address must be provided to the local memory 162 for the line of data currently stored in the cache memory 214. Then, the four double words of data in the line are transferred to the local memory 162 by changing the column address and toggling the CAS# signal between double words. Thereafter, an initial address for the line of data to be retrieved from the local memory 162 must be provided to the local memory 162 and the four double words of data transferred from the local memory 162 to the cache memory 214 by changing the column address and toggling the CAS# signal between double words. The data is also communicated to the processor 160 if the original access that caused the dirty miss was a read access.

In a system using conventional page mode memory techniques, the address for the dirty line of data is typically located in a different row of the dynamic RAMs of the local memory 162. Thus, when the address is changed from the address for the dirty line of data (to be stored in the local memory 162) to the address for the line fill data (to be transferred to the cache memory 214 from the local memory 162), the row address select RAS# signal must be deactivated to precharge the row address lines and then activated to select the row address for the data to be retrieved and to begin the row access. The precharge time and row access time together impose a penalty of approximately 150 nanoseconds in a conventional dynamic RAM memory system. As discussed below, the present invention reduces the penalty by approximately 120 nanoseconds to approximately 30 nanoseconds which corresponds to the column address precharge and access time.

Figure 11:
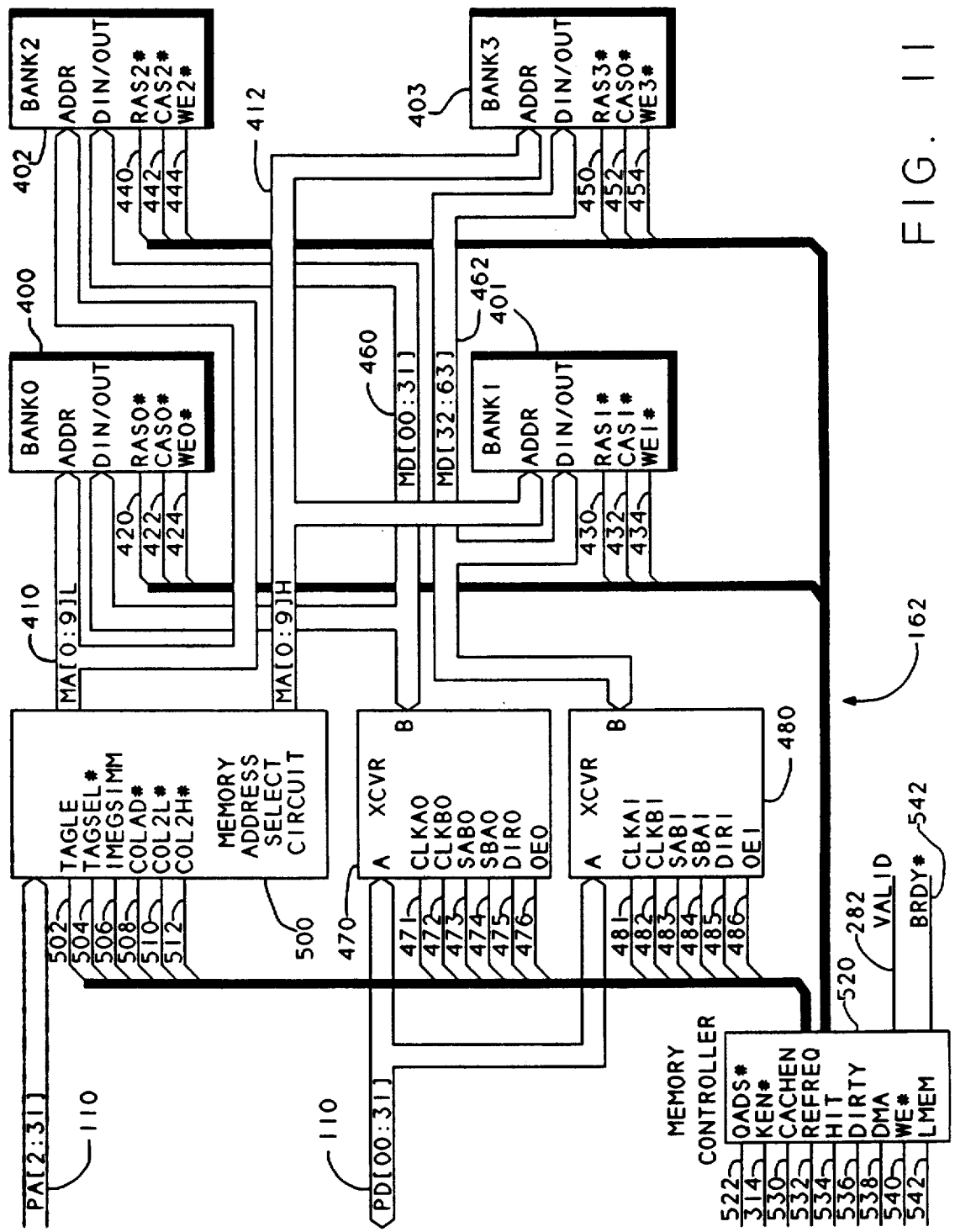
FIG. 11 is a block diagram of an improved local memory in accordance with the present invention.

FIG. 11 is a block diagram of an improved local memory 162 in accordance with the present invention. The improved local memory 162 is described herein in connection with the cache memory system 210 of FIG. 3; however, it should be understood that the improved local memory 162 of FIG. 11 can also be used in combination with other copy back cache memory systems.

The local memory 162 comprises four banks of memory identified as BANK0 400, BANK1 401, BANK2 402 and BANK3 403. In the embodiment described herein, each bank of memory comprises 1 Megabyte of memory and advantageously comprises nine 256K×4-bit dynamic RAM integrated circuits, the ninth RAM storing the four parity bits for each double word of memory. Preferably, and as described herein, the four banks of memory each comprise a single in-line memory module (SIMM) that has the nine memory circuits installed on a single small circuit board that can be plugged in as a single unit. Alternatively, each bank of memory can comprise 4 Megabytes of memory using nine 1M×4-bit dynamic RAM integrated circuits, again preferably constructed on a SIMM. As will be discussed below, one feature of the present invention is that it can be used with the larger RAM circuits without requiring any redesign of the memory control circuit.

Each of the four memory banks 400-403 has ten address inputs. The address inputs for BANK0 400 and BANK2 402 (MA0L-MA9L) are provided on a first common memory address bus 410, and the address inputs for BANK1 401 and BANK3 403 (MA0H-MA9H) are provided on a second common memory address bus 412. As discussed below, the MA9L and the MA9H address lines are used only when 4-Megabyte SIMMs are used.

BANK0 400 is controlled by a row address select (RAS0#) signal on a line 420, a column address select (CAS0#) signal on a line 422 and a WE0# signal on a line 424. BANK1 401 is controlled by a row address select (RAS1#) signal on a line 430, a column address select (CAS1#) signal on a line 432 and a WE1# signal on a line 434. BANK2 402 is controlled by a row address select (RAS2#) signal on a line 440, a column address select (CAS2#) signal on a line 442 and a WE2# signal on a line 444. BANK3 403 is controlled by a row address select (RAS3#) signal on a line 450, a column address select (CAS3#) signal on a line 452 and a WE3# signal on a line 454.

The RAM circuits used in the four memory banks 400-403 each have a single data connection for each bit that is bidirectional such that input data is provided on the connection during a write operation and output data is provided on a read operation. The direction of the data communication is determined by a WE# signal line for each memory bank, and the output of a RAM circuit is only active when a write operation is not being performed and the CAS# line to the RAM circuit is active. The corresponding data connections of BANK0 400 and BANK2 402 are connected in common to a first common data bus 460 and the data bits communicated thereon are identified as MD0-MD31 (shown in FIG. 11 as MD{0:31}). (For convenience in discussing the present invention, the four parity bits are not separately identified. It should be understood one parity bit is included for each byte of the data bits.) Only one of the two banks will store input data or provide output data in accordance with whether the respective WE# lines and CAS# lines are activated. Similarly, the corresponding data connections of BANK1 401 and BANK3 403 are connected in common to a second common data bus 462 and the data bits communicated thereon are identified as MD32-MD63 (shown in FIG. 11 as MD{32:63}).

The first common data bus 460 is connected to the B-bus sides of a set of bidirectional transceivers/registers 470. For example, the set of transceivers/registers 470 advantageously comprise five 74F646A octal transceiver/register integrated circuits available from Texas Instruments, Signetics or National Semiconductor. The A-bus sides of the set of transceivers/registers 470 are connected to the data portion of the local processor bus 110. The set of transceivers/registers 470 are controlled by a first clock signal (CLKA0) on a line 471 which clocks data on the A-bus side into a set of internal A-bus registers; a second clock signal (CLKB0) on a line 472 which clocks data on the B-bus side into a set of internal B-bus registers; a first output select signal (SAB0) on a line 473 which determines whether data from the A-bus or data from the A-bus register is communicated to the B-bus; a second output select signal (SBA0) on a line 474 which determines whether data from the B-bus or data from the B-bus register is communicated to the A-bus; a direction signal (DIR0) on a line 475 which determines whether the A-bus (i.e., the first common data bus 460) is driven by the set of transceivers/registers 470 or whether the B-bus (i.e., the data portion of the local processor bus 110) is driven by the set of transceivers/registers 470; and an enable signal (OE0) on a line 476 that selectively disables the set of transceivers/registers 470 from driving either the A-bus (local processor bus 110) or the B-bus (first common data bus 460).

Similarly, the second common data bus 462 is connected to the B-bus sides of a second set of transceivers/registers 480 which also have their A-bus sides connected to the data portion of the local processor bus 110. The second set of transceivers/registers 480 are controlled by a respective first clock signal (CLKA1) on a line 481; a respective second clock signal (CLKB1) on a line 482; a respective first output select signal (SAB1) on a line 483; a respective second output select signal (SBA1) on a line 484; a respective direction signal (DIR1) on a line 485; and a respective enable signal (OE1) on a line 486.

The ten address lines on the first and second common memory address buses 410 and 412 are connected to respective outputs of a memory address select circuit 500 that is constructed in accordance with the present invention. The memory address select circuit 500 has a plurality of inputs that are connected to the address portion of the local processor bus 110. The memory address select circuit 500 is controlled by a tag address latch enable signal (TAGLE) on a line 502; a tag address select signal (TAGSEL#) on a line 504; a 1MEG-SIMM signal on a line 506; a common column address select signal (COLAD#) on a line 508; a second column select signal (COL2L#) for BANK0 and BANK2 on a line 510; and a second column select signal (COL2H#) for BANK1 and BANK 3 on a line 512.

The four memory banks 400-403, the first and second sets of transceivers/registers 470 and 480, and the memory address select circuit 500 are controlled by a memory controller 520 which generates the signals described above. The memory controller 520 receives a QADS# signal on a line 522 which is generated from the ADS# signal from the processor 160 by AND'ing the ADS# signal with the most significant address bit A31 in an AND-gate 524 so that the memory controller 520 is responsive only to addresses in the first two Gigabytes of the four-Gigabyte addressing range of the 80486 microprocessor. The memory controller 520 is further responsive to the KEN# signal on the line 314 which is generated by the cache memory system 210 as discussed above; a cache enable signal (CACHEN) signal on a line 530 which is generated by a configuration register (not shown) to selectively enable and disable cache operations or to indicate that a cache is present; a refresh request signal (REFREQ) on a line 532 that operates in a conventional manner to periodically refresh the dynamic RAMs in the four memory banks 400-403; a cache hit signal (HIT) on a line 534 which is generated by the cache memory system 210 when the address generated by the processor 160 corresponds to an address for which data is stored in the cache memory 214; a dirty signal (DIRTY) on a line 536 which is generated when there is a cache miss and the location in the cache memory 214 that needs to be swapped out is dirty; a DMA signal (DMA) on a line 538 which is generated when the local processor bus 110 is under the control of a DMA device (not shown) rather than the processor 160; a read/write control signal (WE#) on a line 540 which indicates whether the processor 160 (or a DMA device) is reading from the local memory 162 or writing to the local memory 162; and a local memory decode signal (LMEM) on a line 542 which is generated by an external decoder (not shown) to indicate whether the current address on the local processor bus 110 is directed to an address within the range of the local memory 162. The memory controller 520 generates a BRDY# signal on a signal line 542 when it has data to communicate on the data portion of the local processor bus 110. The memory controller 520 comprises a plurality of programmable array logic (PAL) integrated circuits that are configured to control the operation of the memory controller 520. The configurations of the PAL integrated circuit are described below in connection with a state diagram and in connection with timing diagrams which illustrate the operation of the memory controller 520.

Figure 12:
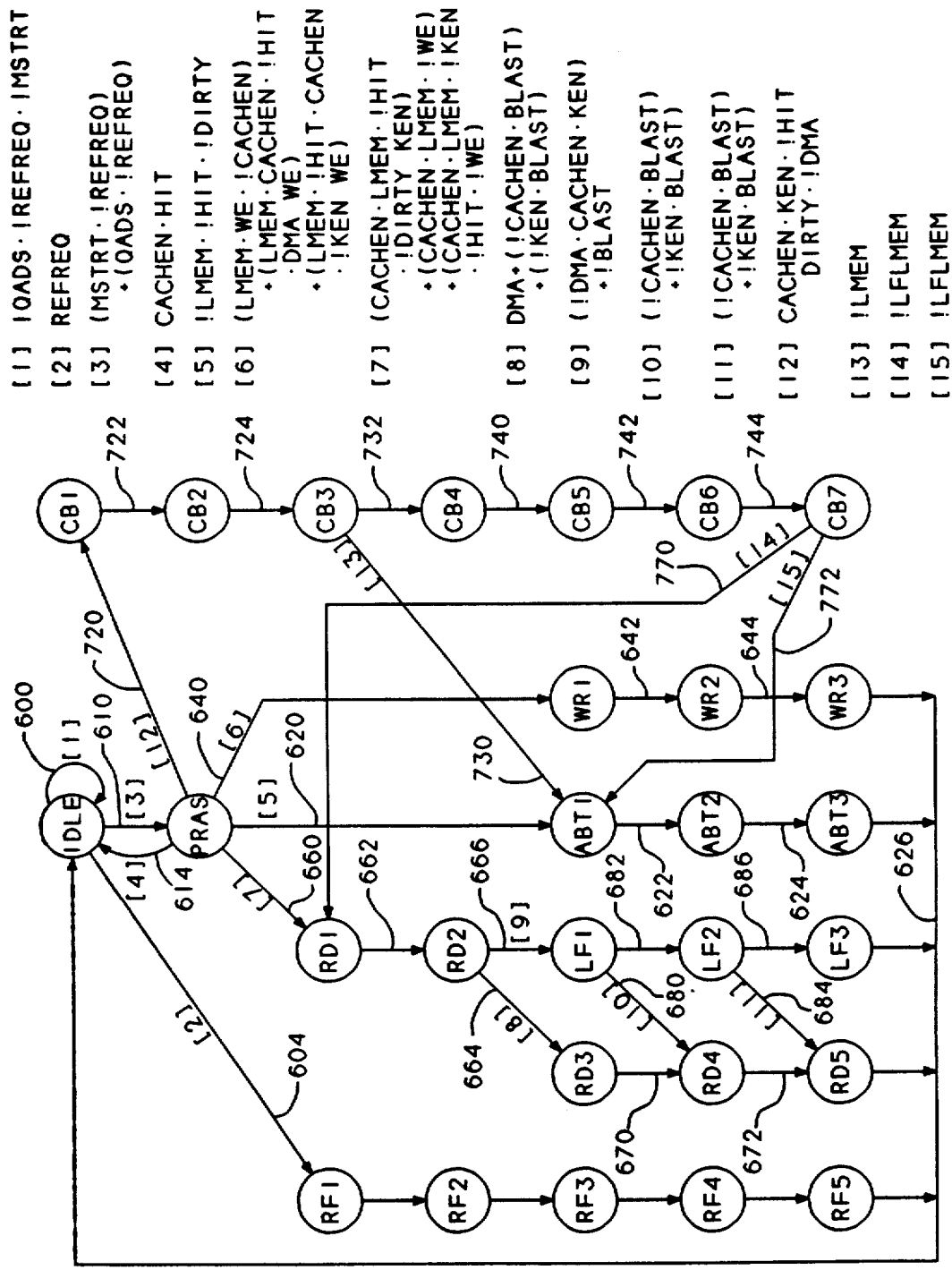
FIG. 12 is a state diagram of the operation of the memory controller in the local memory of FIG. 11.

FIG. 12 which is a state diagram of the operation of the memory controller 520. In the state diagram external signals are listed that control the operation of the memory controller 520. Various states are shown along with directional lines that indicate transitions between the states. A number adjacent a transition identifies a state transition equation in the table adjacent the state diagram. In the state transition equations, a dot indicates the AND function and a plus sign indicates the OR function. An exclamation sign preceding a term in a state equation indicates that the term is a logical one when the corresponding signal is inactive. In the embodiment described herein, each of the states of the memory controller 520 has a duration of one processor clock cycle (i.e., 30 nanoseconds in 33 MHz system). Other state durations can be provided in alternative embodiments of the invention.

It can be seen, for example, that the memory controller 520 has an idle (IDLE) state where it waits for the initiation of a memory operation. The memory controller 520 remains in the IDLE state until it receives one of three stimuli: an active refresh grant signal REFREQ; an active QADS signal; or an active MSTRT signal. The REFREQ and QADS signals have been described above. The MSTRT signal is a latched signal that is generated internally to the memory controller 520 when an active QADS signal is received during a current memory operation. For example, when the memory controller 520 is executing a refresh operation and the processor 160 initiates an access to the local memory 162 by activating the ADS# signal and thus the QADS# signal, the memory controller 520 cannot immediately respond; however, since the ADS# signal is only active for approximately one clock cycle, the memory controller 520 latches the QADS# signal to generate the MSTRT signal. Thus, when the memory controller 520 returns to the IDLE state after completing the refresh operation, it will immediately recognize the active MSTRT signal and begin the requested memory operation. The transition equation [1] for remaining in the IDLE state, as indicated by a transition 600 from the IDLE state to the IDLE state, is:

$$IDLE\ state = !QADS \cdot !REFREQ \cdot !MSTRT \qquad [1]$$

to indicate that as long as all three signals are inactive, the memory controller 520 will remain in the IDLE state.

While in the IDLE state, if the memory controller receives an active REFREQ signal, a transition equation [2] is satisfied:

$$RF1\ state = REFREQ \qquad [2]$$

The memory controller 520 will make a transition 604 to a first refresh state RF1. The refresh operation is not a part of the present invention and will not be described in detail herein. Basically, the dynamic RAM integrated circuits utilized in the present invention include built-in refresh capabilities wherein an internal refresh counter is automatically updated for each refresh. The RAM circuits are caused to perform a refresh cycle by activating the CAS# signal prior to activation of the RAS# signal in a conventional manner. The CAS# signal is activated during the first refresh state RF1. The first refresh state RF1 is followed in sequence by a second refresh state RF2, third refresh state RF3, a fourth refresh state RF4 and a fifth refresh state RF5 during which the RAS# signal is activated and then deactivated. After the fifth refresh state RF5, the memory controller 520 returns to the IDLE state. As discussed above, if an active QADS# signal is received during the refresh cycles, it will be latched as the MSTRT signal.

If, while in the IDLE state, the memory controller receives an active QADS# signal, or if the MSTRT signal has been latched during a previous operation, and if the REFREQ signal is not active, a transition equation [3] will be satisfied:

$$PRAS\ state = (MSRT \cdot !REFREQ) + (QADS \cdot !REFREQ)) \qquad [3]$$

The memory controller will make a transition 610 to a pre-RAS state (PRAS). The PRAS state is included to provide a one processor clock cycle delay prior to initiating a memory cycle to provide sufficient time for the cache memory system 210 to determine whether a cache hit has occurred such that the cache memory system 210 will provide data rather than the local memory 162. During the first half of the PRAS state, the HIT signal from the cache memory system 210 is examined along with the CACHEN signal. If the CACHEN signal is active and the HIT signal is active, a transition equation [4]:

$$IDLE\ state = CACHEN \cdot HIT \qquad [4]$$

Since there has been a hit, the cache memory system 210 will provide data to the processor 160. Thus, the local memory will return to the IDLE state via a transition 614 and no memory cycle will start. On the other hand, if the cache memory system 210 is not enabled or there has not been a hit, during the second half of the PRAS state, the RAS# signal is activated by the memory controller 520 to provide the first 15 nanoseconds of the memory access time (again assuming a 30-nanosecond processor clock cycle).

The local memory 162 is responsive only to a limited range of addresses that depend upon the amount of memory that is installed in it (i.e., up to 4 Megabytes if all four memory banks 400-403 are installed with 1-Megabyte SIMMs and up to 16 Megabytes if all four banks are populated with 4-Megabyte SIMMs). The local memory 162 is installed such that it occupies the lowermost memory addresses in the compute system 200 (i.e., addresses starting with 00000000H). For example, if all four memory banks are installed with 1-Megabyte SIMMs, the four megabytes of local memory 162 occupy addresses 00000000H–003FFFFFH. The LMEM signal on the line 542 is generated by a decoder (not shown) that indicates whether the address on the local processor bus 110 is within the range of the local memory 162. If the LMEM signal is not active, the HIT signal is not active and the DIRTY signal is not active by the end of the PRAS state, a transition equation [5] will be satisfied:

$$ABT1\ state = !LMEM \cdot !HIT \cdot !DIRTY \qquad [5]$$

The memory controller 520 will make a transition 620 to a first abort state ABT1 and then in sequence to a second abort state ABT2 via a transition 622 and a third abort state ABT3 via a transition 624. Thereafter, the memory controller 520 will return to the IDLE state via a transition 626.

Figure 13:
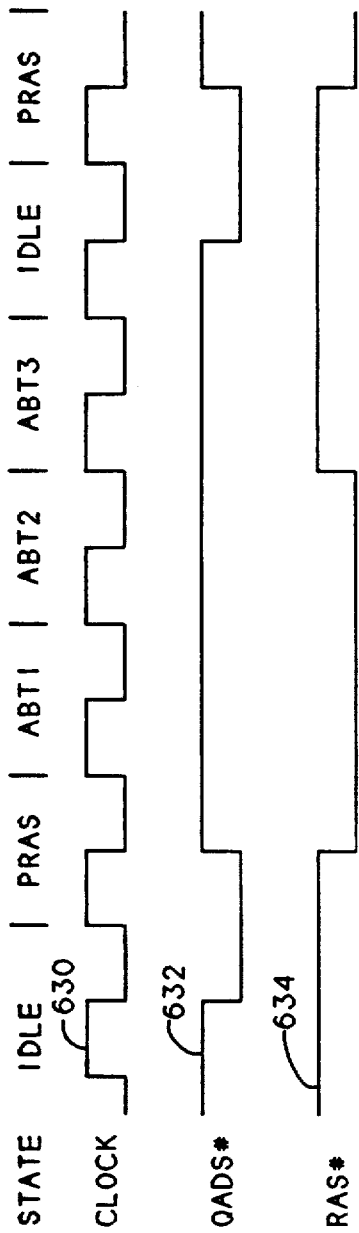
FIG. 13 is a set of timing diagrams illustrating the abort function of the memory controller of FIG. 11 in accordance with the state diagram of FIG. 12.

The function of the abort states ABT1, ABT2 and ABT3 can be better understood by referring to a set of timing diagrams in FIG. 13. A first timing diagram 630 illustrates the processor clock for reference, which, in a 33 MHz computer system, has a cycle time of 30 nanoseconds. A second timing diagram 632 illustrates the QADS# signal which initiates a transition from the IDLE state to the PRAS state. If during the first half of the PRAS state, the cache enable CACHEN and HIT signals are not both active, the memory controller 520 activates the RAS# signal, as shown in a timing diagram 634, so that the RAS# signal is active for the last 15 nanoseconds of the state. Thereafter, the memory controller enters the first abort state ABT1 and then the second abort state ABT2 where it continues to maintain the RAS# signal active for a total active time of 75 nanoseconds (15+30+30). This total active time for the RAS# signal satisfies the RAS# hold time of the dynamic RAM memories that is necessary in order to maintain data in the memories. Thereafter, at the beginning of the third abort state ABT3, the RAS# signal is deactivated and then the memory controller 520 returns to the IDLE state where the RAS# signal continues to be inactive. Assuming that the memory controller 520 immediately leaves the IDLE state to go to the PRAS state, the RAS# signal will not become active for another 15 nanoseconds, as discussed above. Thus, the RAS# signal is inactive for a minimum of 75 nanoseconds to satisfy the precharge time requirements of the dynamic RAMs.

Returning to the state diagram of FIG. 12, if when the memory controller 520 is in the PRAS state, it will make a transition 640 to a first write state WR1 when a transition equation [6] is satisfied:

$$\begin{aligned}WR1\ state\ =\ &(LMEM \cdot WE \cdot !CACHEN) \\ &+ (LMEM \cdot CACHEN \cdot !HIT \cdot DMA \cdot WE) \\ &+ (LMEM \cdot !HIT \cdot CACHEN \cdot !KEN \cdot WE)\end{aligned} \qquad [6]$$

The first term in the transition equation [6] defines a conventional single write to the local memory 162 when the cache is not enabled. Since the cache is not enabled, there can be no line to copy back so only a single write operation will occur (a full double word or one or more bytes in accordance with the conventional byte enable signals generated by the processor 160).

The second term in the transition equation [6] defines a conventional single write to the local memory 162 when the cache is enabled and there has been a miss by a DMA device (not shown). The copy back cache system 210 is particularly effective for repetitive accesses to the same group of addresses such as when the processor 160 is executing an instruction loop or frequently accessing the same data. Thus, it is advantageous to operate on lines (i.e., four double words) of data with respect to the processor data. However, a DMA device typically does not repetitively access the same address. Thus, when a DMA device writes to an address on the local processor bus and a miss occurs, the miss is treated as a single word write to the local memory 162.

The third term in the transition equation [6] is satisfied when the cache is enabled and a miss occurs for an address in the local memory but the address is not cacheable. For example, certain addresses in the lower memory, such as the video ram addresses are not cacheable. Thus, the cache memory system 210 will not activate the KEN# signal and the write to the local memory will be treated as a single write.

The first write state WR1 is followed in sequence by a transition 642 to a second write state WR2 and a transition 644 to a third write state WR3. Thereafter, a transition 646 returns the memory controller 520 to the IDLE state.

Figure 14:
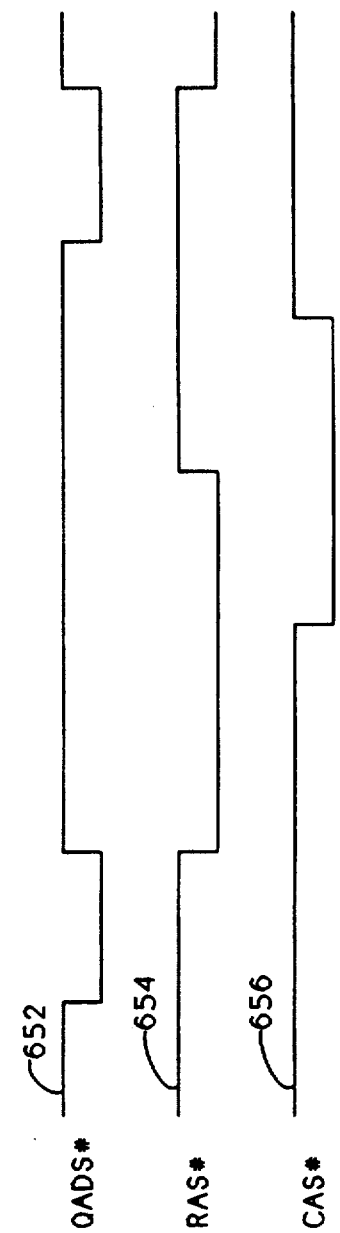
FIG. 14 is a set of timing diagrams illustrating the write function of the memory controller of FIG. 11 in accordance with the state diagram of FIG. 12.

Referring now to FIG. 14, the basic timing diagrams for a conventional write cycle are illustrated, again referenced to the processor clock as illustrated in a timing diagram 650. An active QADS# signal (diagram 652) again initiates a transition to the PRAS state where the RADS# signal is activated halfway through the state, as indicated by a timing diagram 654. Thereafter, at the beginning of the WR1 state, the CAS# signal is activated, as indicated by a timing diagram 656. The CAS signal remains active throughout the first write state WR1, the second write state WR2 and the third write state WR3. The RAS# select signal is deactivated at the end of the second write state WR2 so that it has been active for a total of 75 nanoseconds, thus satisfying the RAS hold requirements. The RAS# signal will remain inactive through the third write state WR3 and the IDLE state and through at least one-half the next PRAS state, providing at least 75 nanoseconds of RAS precharge time. As further illustrated, the CAS# signal will be inactive for at least two clock cycles so as to meet the minimum CAS precharge time.

Returning to the state diagram in FIG. 12, if in the PRAS state, the memory controller 520 will make a transition 660 to a first read state RD1 when a transition equation [7] is satisfied:

$$RD1 = (CACHEN \cdot LMEM \cdot !HIT \cdot !DIRTY \cdot KEN) \\ + (!CACHEN \cdot LMEM \cdot !WE) \\ + (CACHEN \cdot LMEM \cdot !KEN \cdot !HIT \cdot !WE) \quad [7]$$

The first term in the transition equation [7] is true when an address of a cacheable location is generated by the processor 160 that corresponds to an address in the local memory 162. Thus KEN is active. In the first term, the address is not currently cached in the cache memory 214. Thus, HIT will be inactive. However, DIRTY is inactive to indicate that the location in the cache memory 214 has not been changed since it was stored and thus does not need to be swapped out. Thus, the line fill operation can proceed immediately. The line fill operation will be distinguished from the conventional read operation in a later state.

The second term in the transition equation [7] is true when a read operation is initiated to the local memory 162 and the cache system 210 is not enabled. Thus, a conventional read operation is started.

The third term in the transition equation [7] is true when a read operation is initiated to the local memory 162, and, although the cache system 210 is enabled and no hit occurs, the address is a non-cacheable address (the KEN# signal is inactive). Thus, the read operation begins immediately. The first read state RD1 is followed by a second read state RD2 via a transition 662. In the RD2 state, the first double word of data is transferred from the local memory 162 to the local processor bus 110. The memory controller 520 will go to one of two states following the RD2 state depending upon whether it is performing a line fill operation. If a transition equation [8] is satisfied, a transition 664 to a third read state RD3 will occur; otherwise, if a transition equation [9] is satisfied, a transition 666 to a first line fill state LF1 will occur.

The transition equation [8] has the form:

$$RD3\ state = DMA + (!CACHEN \cdot BLAST) + (!KEN \cdot BLAST) \quad [8]$$

The transition equation [8] is satisfied if a DMA operation is occurring. As discussed above, DMA operations are single double word operations and do not operate on a line at a time. The transition equation [8] is also satisfied if the cache system 210 is not enabled or if the address is not a cacheable address. In any of the cases, the memory controller 520 makes the transition 664 to the RD3 state wherein the CAS# signal and the RAS# signal are deactivated. Thereafter, a transition 670 is made to a fourth read state RD4, then to a fifth read state RD5 via a transition 672, and then to the IDLE state via a transition 674. The read states RD3, RD4 and RD5 provide sufficient time to satisfy the precharge requirements of the RAS# signal.

The transition equation [9] has the form:

$$LF1\ state = (!DMA \cdot CACHEN \cdot KEN) + !BLAST \quad [9]$$

The first term in the transition equation [9] is satisfied if the read operation is not a DMA operation, the cache is enabled and the address has been determined to be cacheable (i.e., KEN is true). Thus, the operation is a line fill operation and should proceed uninterrupted. If the address is not a cacheable address for which a line fill operation to the cache memory system 210 can be performed, it still may be a multiple double word transfer to fill up the input buffer of the processor 160. Thus, the second term of the transition equation [9] is !BLAST. In the first line fill state LF1, the memory controller 520 causes a second double word of data to be transferred on the local processor bus 110.

When a transition equation [10] is satisfied, the state LF1 is followed by a transition 680 to the RD4 state. The transition equation [10] has the form:

$$RD4\ state = (!CACHE \cdot BLAST) + (!KEN \cdot BLAST) \quad [10]$$

As discussed above, if the cache is not enabled or the address is not cacheable, the processor 160 controls the communication of data from the local memory 162 to the local processor bus 110 by activating the BLAST signal before the last word that it wants to receive. On the other hand, if the transition equation [10] is not satisfied, a transition 682 is made from the LF1 state to a second line fill state LF2 irrespective of whether the BLAST signal is activated by the processor 160. It should be understood that once a line fill operation from the local memory 162 to the cache memory system 210 is initiated, it should be allowed to complete so that an entire line of data is transferred to the cache memory 214. Otherwise, the partial line of data would have to be marked as invalid. The memory controller 520 can selectively mark a line as invalid by pulling the VALID line 282 low when it activates the BRDY# signal.

Continuing with the state LF2, a transition 686 is made to the RD5 state if a transition equation [11] is satisfied:

$$RD5\ state = (!CACHE \cdot BLAST) + (!KEN \cdot BLAST) \quad [11]$$

Otherwise, if the transition equation [11] is not satisfied, a transition 686 is made to a third line fill state LF3 where the memory controller 520 causes the fourth double word to be transferred to the local processor bus 110. The LF3 state is followed by a transition 688 to the IDLE state. The RAS# signal is deactivated at the beginning of the LF3 state so that sufficient time is provided to precharge the RAS# signal prior to the next possible activation of the RAS# signal.

Figure 15:
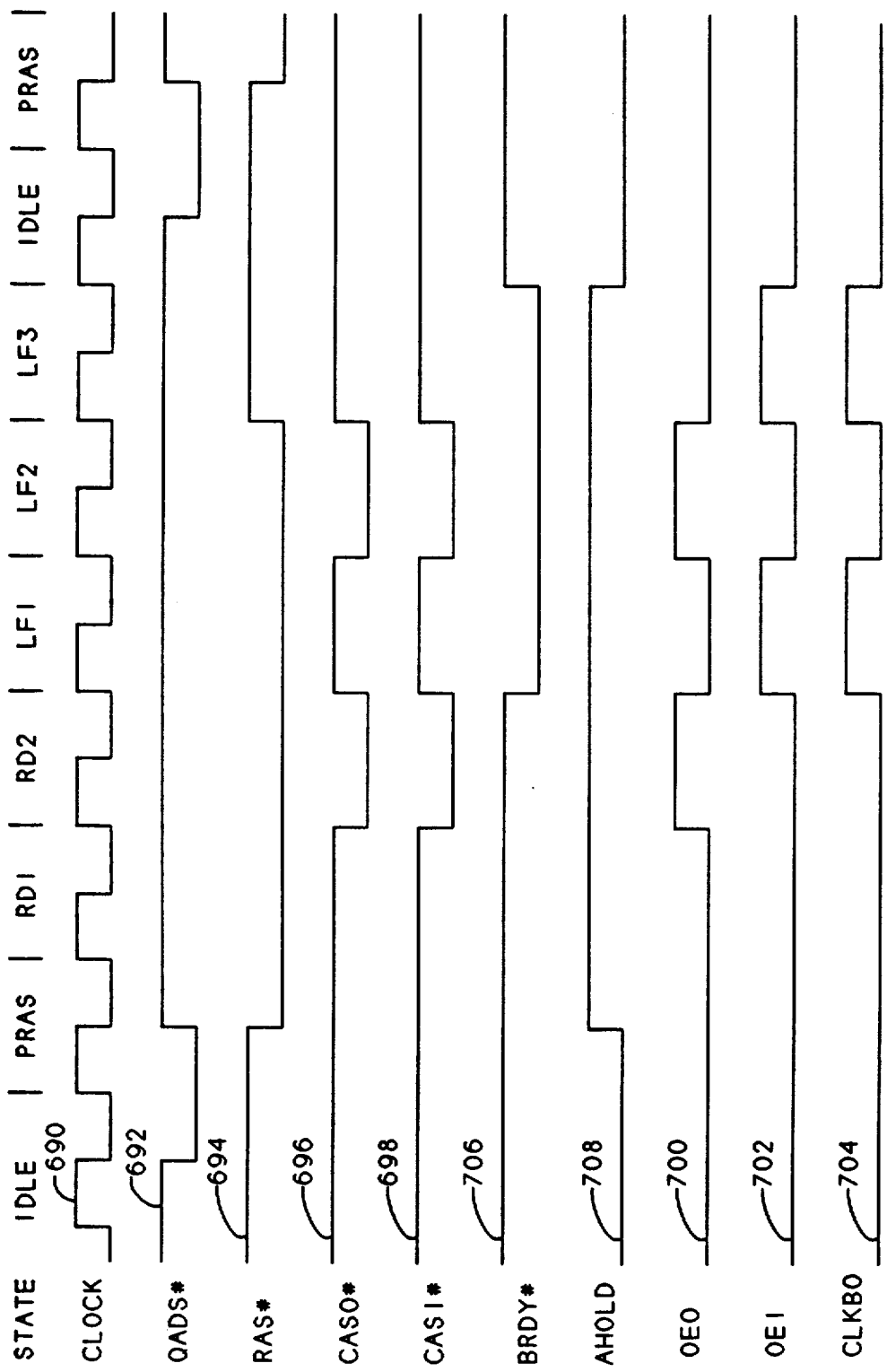
FIG. 15 is a set of timing diagrams illustrating the line fill function of the memory controller of FIG. 11 in accordance with the state diagram of FIG. 12.

FIG. 15 illustrates a set of timing diagrams for the read operation, and, in particular for the line fill operation which accesses BANK0 400 and BANK1 401. Again, the timing diagrams are referenced to the processor clock (diagram 690). When the QADS# signal (diagram 692) becomes active during the IDLE state, the memory controller 520 enters the PRAS state where it activates the RAS# signal halfway through the state. The RAS# signal is maintained in its active state through the RD1 state. At the beginning of the RD2 state the CAS0# signal (diagram 696) and the CAS1# signal (diagram 698) are activated to select the columns of data from the accessed row of both active banks of memory (i.e., BANK0 400 and BANK1 401). During the RD2 state, the OE0 signal (diagram 700) is activated to the first set of bidirectional transceivers/ registers 470 and the direction lines DIR0 and DIR1 (not shown) are selected so that the data from BANK0 400 is communicated to the local processor bus 110. The OE1 signal (diagram 702) is disabled so that the data from BANK1 is not communicated to the local processor bus 110. At the beginning of the LF1 state, the CLKB0 and CLKB1 signals (diagram 704) to the first and second set of bidirectional transceivers/ registers 470 and 480 are activated to latch the data from BANK0 400 and BANK1 401 and the OE1 signal is enabled and the OE0 signal is disabled so that the data from BANK1 401 is communicated to the local processor bus 110 during the LF1 state. Meanwhile, at the beginning of the LF1 state, the BRDY# signal (diagram 706) is activated to cause the processor 160 to input the data from BANK0 400 before it changes to the data from BANK1 401. Also, during the LF1 state, the CAS0# and CAS1# signals (diagrams 696 and 698) are deactivated to precharge the column address select lines prior to selecting the next address. The BRDY# signal remains active so that the processor 160 inputs the data from BANK1 401 at the end of the LF1 state. The CAS0# and CAS1# signals are again activated at the beginning of the LF2 state to access the next addresses in BANK0 400 and BANK1 401. During the LF2 state, the OE0 signal to the first set of transceivers/registers 470 is active to enable the data from BANK0 400 to the local processor bus 110. At the end of the LF2 state, the CLKB0 and CLKB1 signals are activated to latch the data, and during the LF3 state, the OE1 signal to the second set of transceivers/registers 480 is active to enable the data from BANK1 401 to the local processor bus 110. During the line fill operation, the cache memory system 210 maintains an active AHOLD signal (diagram 708) to prevent the processor 160 from utilizing the address bus until the read operation is completed. Thus, even if the processor 160 activates the BLAST# signal (not shown) to indicate that it no longer is inputting data, the cache memory system 210 and the local memory 162 can complete the four double word line fill operation.

The foregoing assumes that the first double word of the line fill is from an address wherein address bit 2 (i.e., PA2) on the local processor bus 110 is a zero. Thus, the data from BANK0 is first communicated to the local processor bus 110, followed by the data from BANK1, then data from BANK0 and then data from BANK1. If the processor address bit PA2 is initially a logical one, the sequence is changed to BANK1, BANK0, BANK1, BANK0. It should be further understood that in order to conform with the interface requirements of the 80486 microprocessor 160, the addresses from BANK0 and BANK1 are transferred to the processor 160 in the following order depending upon the initial state of address bits PA3 and PA2:

|  | PA3/PA2 |  |
| --- | --- | --- |
| INITIAL ADDRESS: | 0/0 | (BANK0; DOUBLE WORD 0) |
| SECOND ADDRESS: | 0/1 | (BANK1; DOUBLE WORD 0) |
| THIRD ADDRESS: | 1/0 | (BANK0; DOUBLE WORD 1) |
| FOURTH ADDRESS: | 1/1 | (BANK1; DOUBLE WORD 1) |
| INITIAL ADDRESS: | 0/1 | (BANK1; DOUBLE WORD 0) |
| SECOND ADDRESS: | 0/0 | (BANK0; DOUBLE WORD 0) |
| THIRD ADDRESS: | 1/1 | (BANK1; DOUBLE WORD 1) |
| FOURTH ADDRESS: | 1/0 | (BANK0; DOUBLE WORD 1) |
| INITIAL ADDRESS: | 1/0 | (BANK0; DOUBLE WORD 1) |
| SECOND ADDRESS: | 1/1 | (BANK1; DOUBLE WORD 1) |
| THIRD ADDRESS: | 0/0 | (BANK0; DOUBLE WORD 0) |
| FOURTH ADDRESS: | 0/1 | (BANK1; DOUBLE WORD 0) |
| INITIAL ADDRESS: | 1/1 | (BANK1; DOUBLE WORD 1) |
| SECOND ADDRESS: | 1/0 | (BANK0; DOUBLE WORD 1) |
| THIRD ADDRESS: | 0/1 | (BANK1; DOUBLE WORD 0) |
| FOURTH ADDRESS: | 0/0 | (BANK0; DOUBLE WORD 0) |

It can be seen that the address sequences above are such that the same address is applied to both BANK0 400 and BANK1 401, and then the outputs are selectively gated onto the local processor bus 110. Thereafter, the address to both banks is changed and the selection process repeated. By operating the two memory banks 400, 401 in this ping-pong fashion, a double word of data is provided to the cache memory system 210 on each processor cycle.

Since the local memory 162 is provided only with the initial address of the line fill, the memory controller 520 must cause the four-address sequences to be generated. This is readily accomplished by latching the original address to provide a set of latched address bits LA2--LA26, for example. After outputting data from the first active bank and then the second active bank, the latched address bit LA3 is toggled to select the next double word in each bank and the double words from each bank are output once again in the same order. The COL2L# signal and the COL2H# signal are toggled by the memory controller 520 to selectively invert the latched address bit LA3 in the memory address select circuit 500. The address bit LA3 is communicated to the memory banks 400-403 as the least significant address bit during the column address select portion of a memory cycle. (It should be noted that the latched address bit LA2 is used to select between BANK0 400 and BANK1 401 and to select between BANK2 402 and BANK3 403. The address bits PA1 and PA0 are not used to select a memory location as they select the four bytes within a double word.)

Returning to the state diagram in FIG. 12, if in the PRAS state, a state transition equation [12] is satisfied, a transition 720 is made to a first copy back state CB1. The transition equation [12] has the form:

$$CB1\ state = CACHEN \cdot KEN \cdot !HIT \cdot DIRTY \cdot !DMA \qquad [12]$$

As discussed above, a copy back operation is required when the cache system 210 is enabled, the address is a cacheable address, a miss has occurred (i.e., HIT is inactive), the miss was a dirty miss (i.e., the line of data currently stored in the required cache location has been modified by the processor 160 or a DMA operation) and the current memory access has not been generated by a DMA device (i.e., the current access is from the processor 160). When this occurs, the local memory 160 knows that a copy back operation is to occur and the transition 720 to the CB1 state is caused to occur.

In the CB1 state, the RAS# signal is maintained in its active state, and a transition 722 to a second copy back state CB2 occurs. Again, the RAS# signal is maintained in its active state, and transition 724 to a third copy back state CB3 occurs. In the CB3 state, the LMEM# signal is again examined. If the LMEM# signal is no longer active, then a transition equation [13] is satisfied:

$$ABT2\ state = !LMEM \qquad [13]$$

A transition 730 is made to the ABT2 state wherein the RAS# signal is deactivated and the memory controller 520 proceeds through the ABT2 state to the IDLE state. Otherwise, if the transition equation [13] is not satisfied, a transition 732 to a fourth copy back state CB4 is made.

The evaluation of the LMEM# signal in the CB3 state is necessary because of the nature of the copy back/line fill operation. The copy back/line fill operation was initiated because a cache miss occurred on a cacheable address that was directed to the local memory 162. However, the decoded address was for the line fill portion of the operation (i.e., the address from which data is to be read). The copy back address is determined by the address in the tag RAM 252 ("the TAG address") which is not available until after the copy back operation begins. In particular, the TAG address is not gated onto the local processor bus 110 until the beginning of the CB2 state. The TAG address must be decoded by the decoder (not shown) to determine whether it is directed to the local memory 162 and to generate the LMEM# signal if it is so directed. On the other hand, if the TAG address is directed to the P-Bus memory 150, for example, the LMEM# signal is not active in the CB3 state, and the copy back operation is aborted. The copy back operation will proceed in the P-bus memory 150, for example. The operation of the P-bus memory 150 in handling the copy back procedure is not part of the present invention.

During the CB4 state, the CAS# signal is activated for the first memory address to be written. Thereafter, a transition 740 to a fifth copy back state CB5 is made wherein the CAS# signal for the second memory address to be written is activated. The second memory address will be in the opposite bank from the first memory address. Continuing on, a transition 742 is made to a sixth copy back state CB5 wherein the CAS# signal for the third memory address is activated (i.e., the first bank) and then to a seventh copy back state CB7 wherein the CAS# signal for the fourth memory address is activated (i.e., the opposite bank). Assuming that the address is for a location in BANK0 and BANK1, the first double word is written in BANK0 if bit 2 in the address portion of the local processor bus 110 (i.e., PA2) is zero; the second double word is written in BANK1; the third double word is written in BANK0; and the fourth double word is written in BANK1. If PA2 is a logical one, the four double words will be written in BANK1, BANK0, BANK1 and BANK0, in that order. The first memory address to be written depends upon the address bits 2 and 3, as discussed above for the line fill operation, and the COL2L# and COL2H# signals from the memory controller 520 determine which address locations are written in the sequences listed above.

Figure 16:
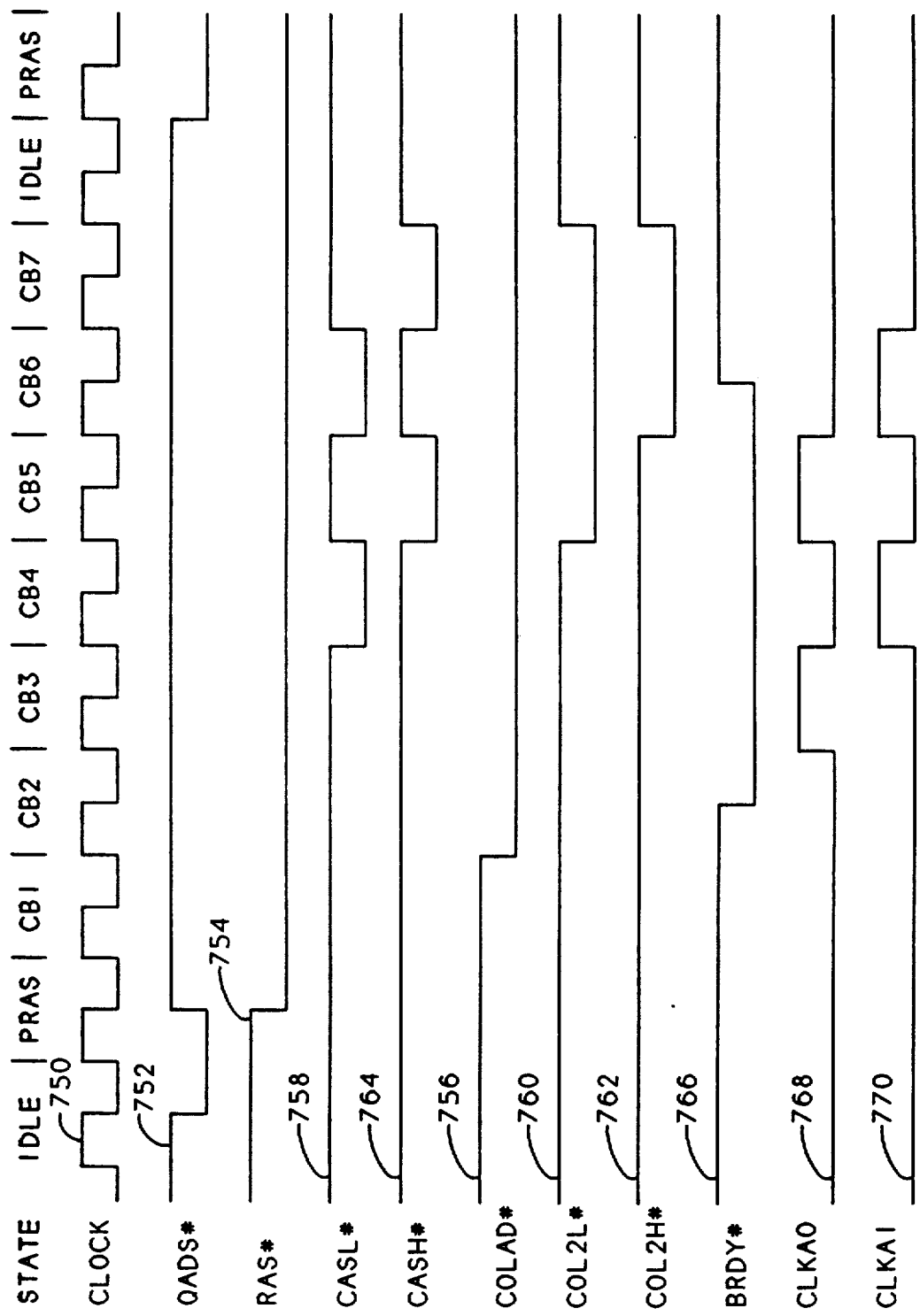
FIG. 16 is a set of timing diagrams illustrating the copy back function of the memory controller of FIG. 11 in accordance with the state diagram of FIG. 12.

Timing diagrams for the copy back operation are illustrated in FIG. 16. A timing diagram 750 for the processor clock is provided as a reference. A timing diagram 752 for the QADS# signal illustrates that the QADS# signal becomes active during the IDLE state and causes the memory controller 520 to enter the PRAS state, where the RAS# signal is activated (diagram 754). Thereafter, the memory controller 520 enters the first copy back state CB1, and then states CB2 and CB3. In the CB2 state, the column address select (COLAD#) signal (diagram 756) is activated by the memory controller 520 to select the column addresses out of the memory address select circuit 500. Assuming the memory address remains directed to the local memory 162, the memory controller 520 enters the fourth copy back state CB4 wherein the CASL# signal (diagram 758) for the first memory bank is activated. In FIG. 16, the CASL# signal is activated to select BANK0 400 during the CB4 state. Column address select signals COL2L# (diagram 760) and COL2H# (diagram 762) are both inactive to select the original PA3 address as the least significant address bit (MA:00) to the memory banks. The data is written to BANK0 400 during the CB4 state. Thereafter, in the CB5 state, the CASH# signal (diagram 764) is activated to select BANK1 401 to write data into BANK1 401. Also in the CB5 state, the COL2L# signal is toggled to invert the least significant address bit to BANK0 400 so that in the CB6 state, when the CASL# signal is again activated, the next double word in BANK0 400 is selected. During the CB6 state, the COL2H# signal is toggled to invert the least significant address bit to BANK1 401 so that in the CB7 state, when the CASH# signal is again activated, the next double word in BANK1 401 is selected. As discussed above, if the initial starting address is in BANK1 401, the active portions of the CASL# signal and the CASH# signals will be interchanged (i.e., CASH# will be active in the CB4 and CB6 states, and CASL# will be active in the CB5 and CB7 states), COL2H# will become active in the CB5 state, and COL2L# will not become active until the CB6 state.

As further illustrated in FIG. 16, the memory controller 520 activates the BRDY# signal (diagram 766) during the CB2, CB3, CB4 and CB5 states to cause the cache memory system 210 to send the next double words of data. The data for the first memory bank to be written (e.g., BANK0 400 in the present example) is latched into the first set of transceivers/registers 470 by a clock pulse (CLKA0, timing diagram 768) that occurs at the beginning of the CB3 state so that the data is held while the cache memory system 210 is changing the data for the next double word. Similarly, the second double word of data is latched into the second set of transceivers/registers 470 by a clock pulse (CLKA1, timing diagram 770) that occurs at the beginning of the CB4 state. This sequence is repeated in the CB5 and CB6 states. The signals DIR0 and DIR1 (not shown) are selected to cause the first and second sets of transceivers/registers 470 and 480 to convey data from the local processor bus 110 to the common memory data buses 460 and 462.

Returning to the state diagram in FIG. 12, at the end of the CB7 state, a decision is again made where to continue. As discussed above, the copy back portion of the copy back/ line fill operation can be in the P-bus memory 150 and the line fill portion of the operation can be in the local memory 162. Similarly, the copy back portion of the operation can be in the local memory 162 as just described, and the line fill portion in the P-bus memory 150. Thus, in the CB7 state, a determination is made as to whether the line fill address is in the local memory 162. Since the line fill address has long since been replaced with the TAG address for the copy back operation, the address portion of the local processor bus 110 cannot be evaluated to determine whether the line fill is directed to the local memory 162 or the P-bus memory 150. Instead, the memory controller 520 latches the state of the LMEM# signal as a LFLMEM signal when the QADS# or the MSTRT# signal is activated during the IDLE state, and holds the state of the latched signal throughout the PRAS state and the copy back states CB1-CB7. Thus, in the CB7 state, only the latched LFLMEM signal need be evaluated.

If, in the CB7 state, the LFLMEM signal is inactive, a transition equation [14] is satisfied:

$$ABT2\ state = !LFLMEM \qquad [14]$$

A transition 770 is made to the ABT2 state, where the RAS# signal is deactivated, and thence to the ABT3 state and the idle state. The line fill portion of the copy back/line fill operation will continue in the P-bus memory 150.

If, in the CB7 state, the LFLMEM signal is active, a transition equation [15] is satisfied:

$$RD1\ state = LFLMEM \qquad [15]$$

A transition 772 is made to the RD1 state to initiate the line fill portion of the operation as discussed above.

Figure 17:
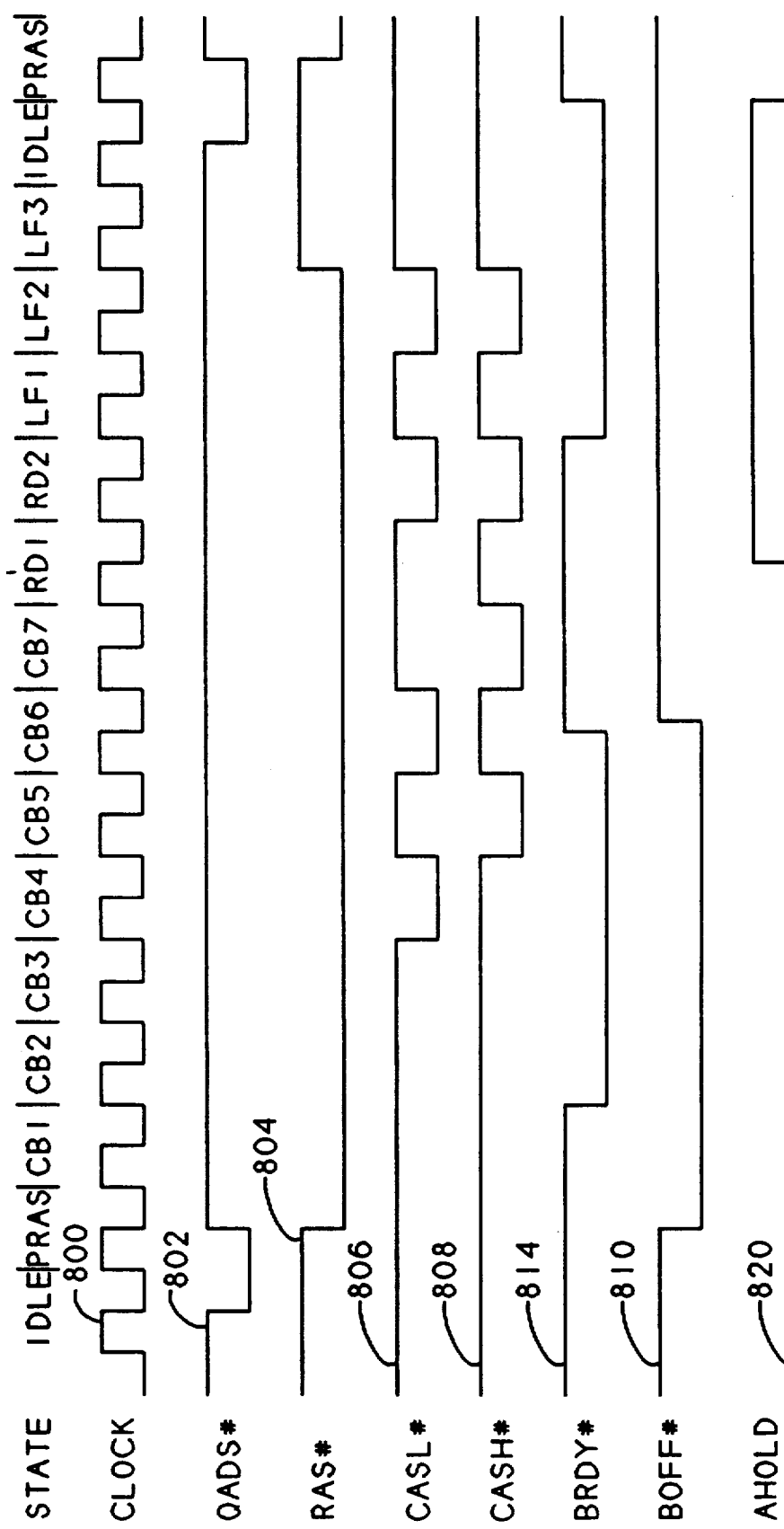
FIG. 17 illustrates timing diagrams for the combined copy back/line fill operation of the memory controller of FIG. 11 in accordance with the state diagram of FIG. 12.

One particularly important aspect of the present invention is the transition of the memory controller 520 from the CB7 state to the RD1 state without requiring any intermediate states. Instead of returning to the IDLE state to deactivate the RAS# signal to the memory banks and waiting for a sufficient time to precharge the RAS# signal, the RAS# signal is maintained in its active state in the present invention so that no precharging is required and so that no row access time is required. FIG. 17 illustrates timing diagrams for the combined copy back/line fill operation wherein the clock signal (diagram 800) is provided for reference; the QADS# signal (diagram 802) is activated in the IDLE state to initiate the copy back/line fill operation; the RAS# signal (diagram 804) is activated in the middle of the PRAS state and remains active until the end of the LF2 state; and the CASL# signal (diagram 806) and the CASH# signal (diagram 808) are activated alternately in the copy back portion of the operation and activated together during the line fill portion of the operation.

A backoff signal (BOFF#) is illustrated in a timing diagram 810 in FIG. 17. The BOFF# signal is generated by the cache memory system 210 in the next cycle following the activation of the ADS# signal by the processor 160 (shown as the QADS# signal 802 in FIG. 17) and is provided as an input to the processor 160 via a signal line 812 (FIG. 3). When the BOFF# signal is active, the 80486 microprocessor 160 is forced to float its outputs to the local processor bus 110 until the BOFF# signal is deactivated. If a bus cycle is in progress when the BOFF# signal is activated, the processor 160 will reinitiate the interrupted bus cycle when BOFF# becomes inactive.

The backoff feature of the 80486 microprocessor is used to advantage in the present invention to provide the line fill addresses to the local memory 162 during the line fill portion of the copy back/line fill operation. As illustrated in FIG. 17, the BOFF# signal 810 is deactivated by the cache memory system 210 when the BRDY# signal (diagram 814) becomes inactive during the CB6 state. The processor 160 responds to the deactivation of the BOFF# signal by repeating the previous bus cycle (i.e., the memory cycle that caused the copy back/ line fill operation to occur), as indicated by a second active QADS# signal 820 in the QADS# timing diagram 802. At the same time, the processor 160 will have again placed the original memory address on the local processor bus 110. This memory address will again be detected as a cache miss. However, since the cache memory system 210 has completed the copy back portion of the copy back/line fill operation, the cache location needed for the line fill will no longer be dirty since the data in the local memory 162 now corresponds to the data in the cache. Thus, the cache memory system 210 will consider the second active QADS# signal to be the beginning of a clean line fill operation. Therefore, the cache memory system 210 will wait for the active BRDY# signals from the local memory 162 to store the data in the cache memory 214. Meanwhile, the cache memory system 210 has activated the address hold (AHOLD) signal (diagram 820) so that the processor 160 cannot utilize the bus until the entire four double word line fill operation is complete.

As illustrated in FIG. 17, the timing of the present invention is such that when the memory controller 520 goes from the CB7 state to the RD1 state, it deactivates the CASH# signal for one clock cycle and then immediately reactivates the CASH# signal along with the CASL# signal for the first addresses of the local memory from which to obtain the line fill data.

Figure 18:
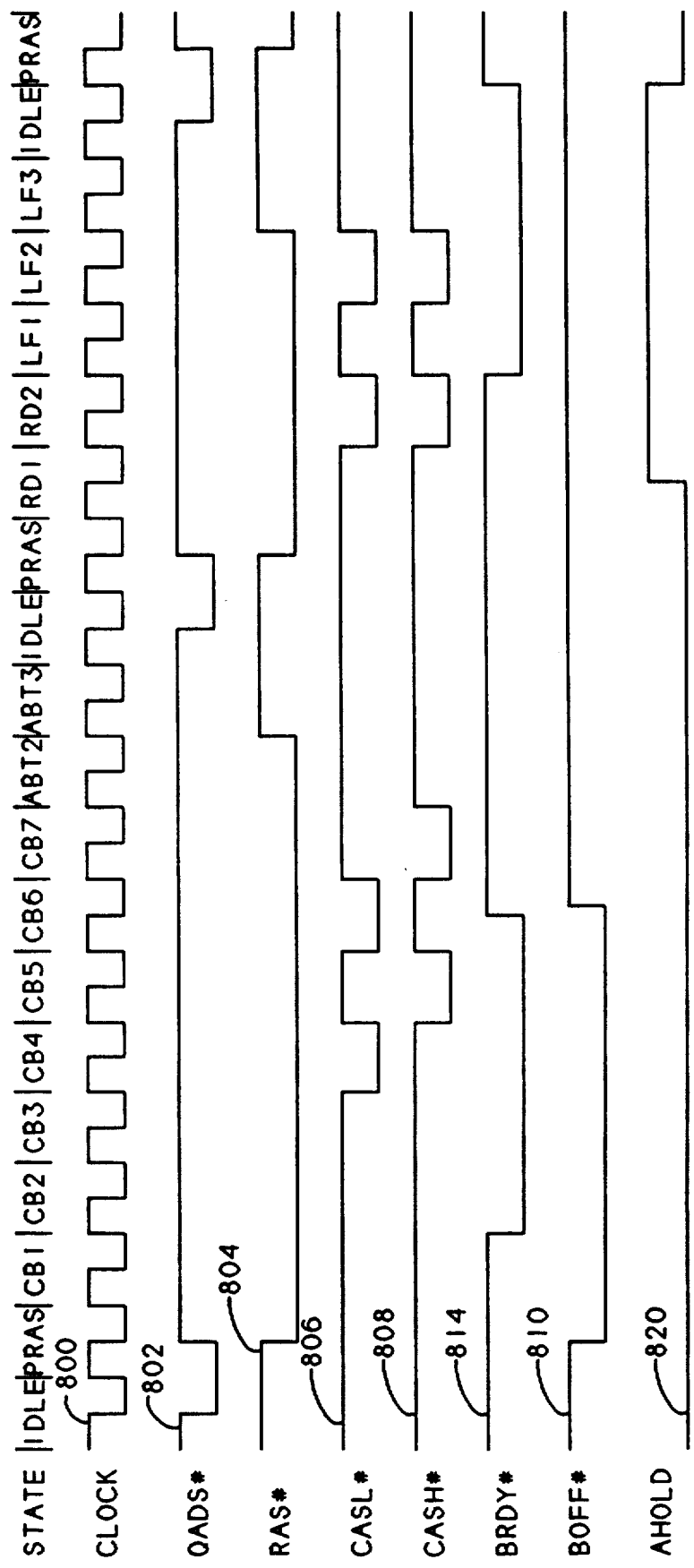
FIG. 18 illustrates timing diagrams for a combined copy back/line fill operation of an exemplary memory controller without the present invention showing the increased time required to complete the operation when the row address select line has to be deactivated and reactivated between the copy back and the line fill.

The advantages of the present invention will be more apparent when comparing the timing diagrams of FIG. 17 with a set of timing diagrams in FIG. 18, again referenced to the processor clock signal (diagram 830). The copy back/line fill operation is initiated by an active QADS# signal (diagram 832) and the RAS# signal (diagram 834) is activated during the PRAS state. Unlike the present invention, wherein the RAS# signal remains active during the transition from the copy back portion of the operation to the line fill portion of the operation, in a conventional memory system, the RAS# signal is deactivated at the end of the copy back portion, because the row address will change to a new row address, and the memory controller 520 would have to return to the IDLE state to await the next QADS# signal. Furthermore, as discussed above in connection with the copy back portion of the copy back/line fill operation, the copy back portion must return through the ABT2 and the ABT3 states in order to provide sufficient precharge time in the event that the QADS# signal immediately became active in the IDLE state. If the QADS# signal does become active during the first IDLE state, as illustrated in FIG. 18, the memory controller 520 would proceed through the PRAS state to the RD1 state. By comparing FIG. 18 to FIG. 17, it can be seen that maintaining the RAS# signal active between the copy back and line fill portions of the copy back/ line fill operation, four clock cycles are saved corresponding to a saving of 120 nanoseconds for each copy back/line fill operation. In applications where cache swapping occurs frequently, the time saving will quickly add up to a substantial improvement in the overall system execution speed.

The improved performance of the present invention depends upon holding the RAS# signal active between the copy back and line fill portions. However, in conventional memory systems, the RAS# signal cannot be held constant because the row address for the copy back locations in the local memory 162 would be different from the row address for the line fill locations in the local memory 162. In particular, the column addresses of a dynamic RAM memory are generally mapped to the least significant address bits of the local processor bus 110 (i.e., PA12-PA4 for 256K×4 RAM circuits; PA13-PA4 for 1M×4 RAM circuits). The address bits above bit 12 or above bit 13, will then define the row addresses. Thus, since these address bits define only a 256 KByte address space or a 1 MByte address space, respectively, it is highly likely that the row address will change between the copy back of the dirty line of data and the line fill of the new line of data. The present invention takes advantage of the fact that the column address select (CAS#) precharge time and the column address access time are each less than 30 nanoseconds and thus less than one clock cycle. Thus, the column addresses can be readily changed every other clock cycle without having to include additional clock cycles as for the row address. The present invention further takes advantage of the fact that in a copy back/line fill operation, the least significant address bits do not change between the copy back portion and the line fill portion because the current address stored in the tag RAM 252 to be swapped out and the new address to be swapped in have the least significant address bits in common. Thus, in the present invention, the origin of the row addresses and the column addresses are swapped so that the most significant address bits on the local processor bus 110 (the bits that change between the copy back and the line fill operation) drive the column addresses of the dynamic RAMs in the memory banks 400–403, and the least significant bits on the local processor bus 110 (the bits that do not change between the copy back and the line fill operation) drive the row addresses of the RAMs.

The mapping of the present invention is illustrated in FIG. 19 for 1 Megabit RAMs (i.e., 256K×4 RAMs). As illustrated, the nine row addresses to the RAM circuits are selected to be address bits 15-7 from the local processor address bus 110. In a copy back/line fill operation, address bits 15-7 will not change between the copy back portion and the line fill portion of the operation. Thus, by selecting address bits 15-7 as the row addresses, it is not necessary to deactivated and reactivate the RAS# signal line between the copy back portion and the line fill portion of the operation. Therefore, the time savings discussed above is provided. The nine column addresses to the RAM circuits are selected to be address bits 20-16 and 6-3. Address bits 20-16 will change between the copy back and line fill portions since during the copy back portion, the address bits are provided as the outputs of the tag RAM 252, and during the line fill portion, the address bits are provided by the local processor bus 110 when the processor 160 reinitiates the bus operation when the BOFF# signal is deactivated. Address bits 6-3 are also included as column addresses.

FIG. 20 illustrates the address mapping for 4 Megabit RAMs (i.e., 4M×4 RAMs). As illustrated, the 4 Megabit RAMs include one extra address input that must have an address bit mapped to it during the row address select time and an address bit mapped to it during the column address select time. Basically, bits 21 and 22 of the local processor bus 110 and from the tag RAM 252 become active. Since both address bits will change between the copy back portion and the line fill portion, both addresses are mapped to the column addresses of the dynamic RAMs. Address bit 6 is remapped to the row address select portion since it will not change between the copy back and line fill portions.

Figure 21:
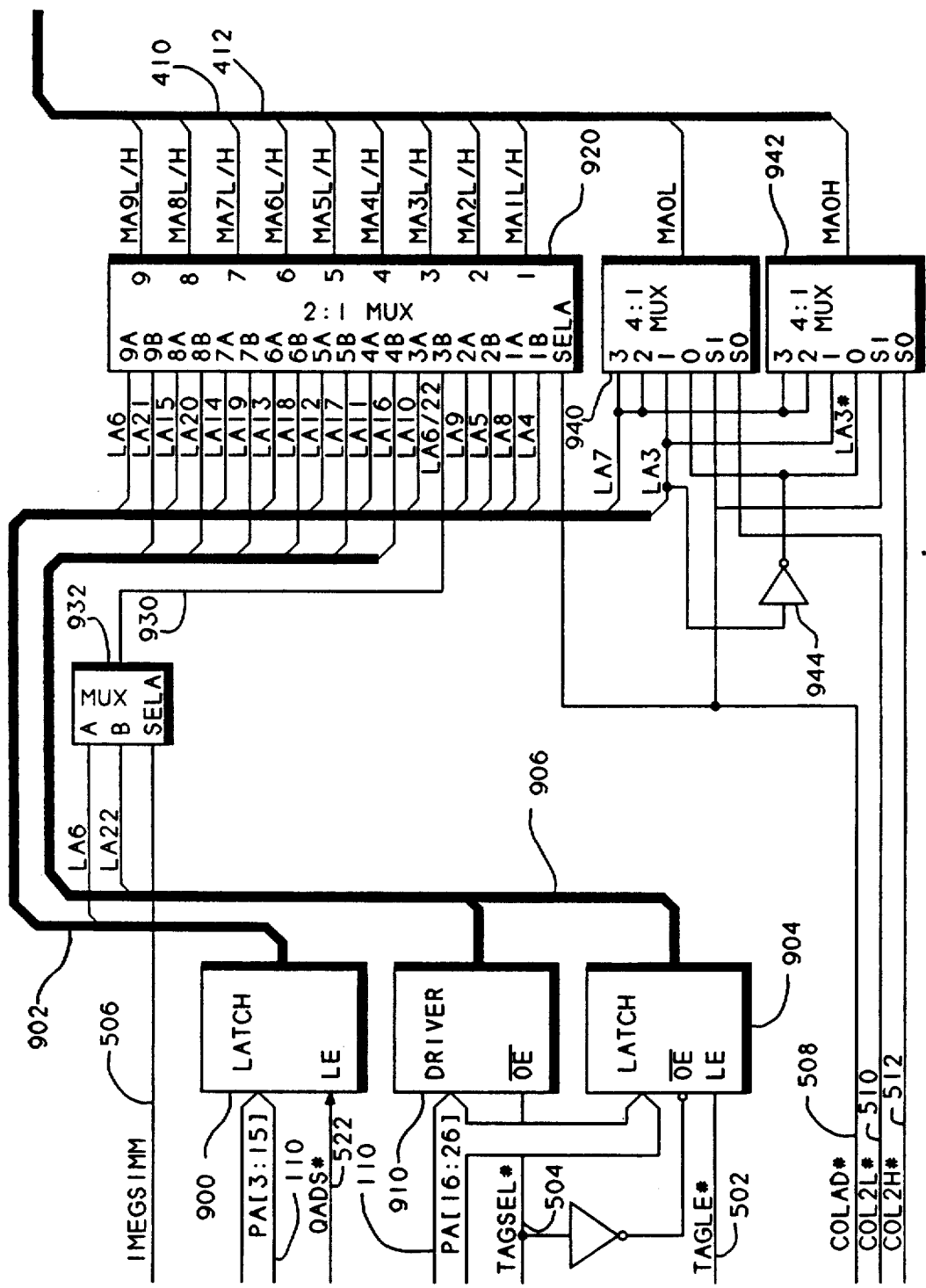
FIG. 21 is a block diagram of the memory address select circuit of FIG. 11 for mapping the processor addresses to the memory addresses for 256K×4 dynamic RAMs and 1M×4 dynamic RAMs.

The address select circuit 500 of the present invention that provides the address bit swapping is illustrated in FIG. 21. In particular, the address select circuit 500 implements the two address maps of FIGS. 19 and 20 so that the addresses are remapped automatically when the local memory 162 comprises 4 Megabyte SIMMs rather than 1 Megabyte SIMMs. It should be noted that the dynamic RAM modules (i.e., the SIMMs) are constructed such that 1 Megabyte SIMMs and 4 Megabyte SIMMs are pin compatible. The two extra address bits required to address a 4 Megabyte SIMM are connected to pins that are not used on a 1 Megabyte SIMM.

The address select circuit 500 comprises a first address latch 900 that receives address bits 2-15 from the address portion of the local processor bus 110. The first address latch 900 is latched when the QADS# signal occurs. The outputs of the first address latch 900 comprise a first latched address bus 902. A second address latch 904 receives address bits 16-26 from the local processor bus 110. The second address latch 904 is latched on the occurrence of the TAGLE signal from the memory controller 520 when the tag RAM 252 is driving the address portion of the local processor bus 110 and causes the TAG address from the tag RAM 252 to be latched. The outputs of the second address latch 904 are provided to a second latched address bus 906 that comprises latched address bits 16-26. The second address latch 904 enables its latched address bits to the second latched output bus 906 when the TAGSEL# signal from the memory controller 520 is active and thus drives the second latched output bus 906 during the copy back portion of the copy back/line fill operation. A bus driver circuit 910 receives address bits 16-26 from the local processor bus 110 and gates the address bits to the second latched address bus 906 when the TAGSEL# signal is not active. Thus, the bus driver circuit 910 drives the second latched address bus 906 during the line fill portion of the copy back/line fill operation and during the read and write operations described above.

A two-to-one multiplexer (2:1 MUX) 920 drives the nine address lines MA1L-MA9L on the first memory address bus 410 to BANK0 400 and BANK2 402 and the nine address lines MA1H-MA9H on the second memory address bus 412 to BANK1 401 an BANK3 403. The multiplexer 920 actually comprises two separate sets of two-to-one multiplexers, one to drive the loading on each memory address bus 410 and 412; however, since the two multiplexers are functionally equivalent, only one multiplexer is shown. The output signals from the multiplexer 920 are shown as MA1L/H, for example, to show that the multiplexer 920 is driving both memory buses 410 and 412. It should be noted that the MA9L and MA9H signals are connected only if 4 Megabyte SIMMs are used. If 1 Megabyte SIMMs are used, the MA9L and MA9H signals go to unused connections on the SIMMs.

The multiplexer 920 is controlled by the COLAD# signal line discussed above. The COLAD# line is inactive high when selecting row addresses and is active low when selecting column addresses. The bits that determine the row addresses are applied to the A inputs of the multiplexer 920 (e.g., LA:6 to 9A, LA:15 to 8A, LA:14 to 7A, LA:13 to 6A, LA:12 to 5A, LA:11 to 4A, LA:10 to 3A, LA:9 to 2A, LA:8 to 1A) and are selected when the COLAD# signal is in active high. The bits that determine the column addresses are applied to the B inputs of the multiplexer 920 (LA:21 to 9B, LA:20 to 8B, LA:19 to 7B, LA:18 to 6B, LA:17 to 5B, LA:16 to 4B, LA:5 to 2B, and LA:4 to 1B) and are selected when the COLAD# is active low.

The 3B input to the multiplexer 920 provide the column addresses to the MA3L and the MA3H signal lines. The 3B inputs are connected to a signal LA6/22 on a signal line 930. The signal LA6/22 is generated by a two-to-one multiplexer (2:1 MUX) 932 that has the latched address bit 6 (LA:6) connected to its A input and the latched address bit 22 (LA:22) connected to its B input. The 2:1 multiplexer 932 is controlled by the configuration signal (1MEGSIMM#) which is active low to select the A input (i.e., to select LA:6) when 1 Megabyte SIMMs are installed in the local memory 162 and is inactive high to select the B input (i.e., to select LA:22) when 4 Megabyte SIMMs, or larger, are installed. The 1MEGSIMM# signal is provided as an output of a configuration register (not shown) in a conventional manner. It can thus be seen that the two tables of FIGS. 19 and 20 are implemented by the multiplexers 920 and 932. It should be noted that the first address latch 900 and the multiplexer 920 provide the only delay for the row address signals so that when a new address is applied to the local processor bus 110 and the QADS signal is activated, the setup time for the RAM addresses prior to the activation of the RAS# signal is satisfied.

As discussed above, the least significant address bit to the dynamic RAMs is automatically changed during a burst read during line fill or a burst write during copy back. This is accomplished by providing a first four-to-one multiplexer (4:1 MUX) 940 for the MA0L address bit to BANK0 400 and BANK2 402 and providing a second 4:1 multiplexer (4:1 MUX) 942 for the MA0H address bit to BANK1 401 and BANK3 403. Each of the 4:1 multiplexers 940 and 942 has four inputs (0, 1, 2 and 3) and an output. Inputs 3 and 2 of each multiplexer 940 and 942 are connected to the LA:7 signal. Input 1 of each multiplexer is connected to the LA:3 signal. Input 0 of each multiplexer is connected to an inverted LA:3 signal provided as the output of an inverter 944. The selection of the input gated to the output is controlled by a pair of select inputs, S0 and S1. When S1 and S0 are both low, input 0 is selected. When S1 is low and S0 is high, input 1 is selected. When S1 is high and S0 is low, input 2 is selected. When S1 and S0 are both high, input 3 is selected. The S1 input is controlled by the COLAD# signal so that when the COLAD# signal is inactive high, the LA:7 signal is provided as the output of each multiplexer 940 and 942 as the row address to the dynamic RAMs. When the COLAD# signal is active low, the LA:3 signal or the inverted LA:3 signal is provided as the column address output of the first 4:1 multiplexer 940 in accordance with whether the COL2L# signal is active or inactive. Similarly, when the COLAD# signal is active low, the LA:3 signal or the inverted LA:3 signal is provided as the column address output of the second 4:1 multiplexer 942 in accordance with whether the COL2H# signal is active or inactive. Again, only the first latch 900 and the 4:1 multiplexers 940 and 942 interpose delay between the local processor bus 110 and the RAM circuits so that the row addresses satisfy the setup time before the RAS# signal is activated.

Figure 22:
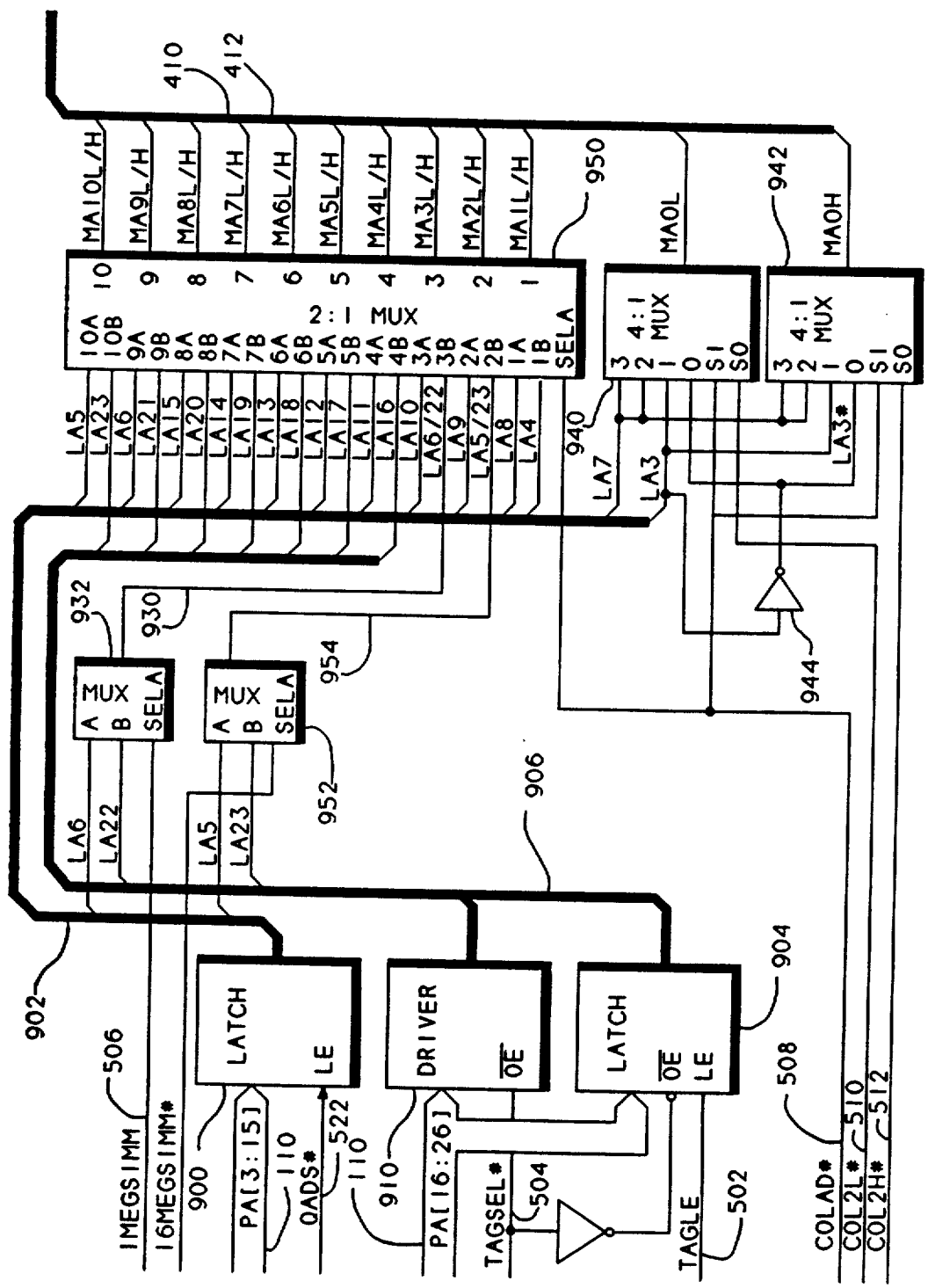
FIG. 22 is a block diagram of a memory address select circuit similar to the memory address select circuit of FIG. 22 for mapping processor addresses to memory addresses for 256K×4 dynamic RAMs, 1M×4 dynamic RAMs and 4M×4 dynamic RAMs.

Although described above in connection with 1 Megabyte SIMMs and 4 Megabyte SIMMs, it should be understood that the same principles can be applied to larger SIMMs, for example 16 Megabyte SIMMs, by adding one additional multiplexer stage to the multiplexer 920 for each address bit added to the RAM circuits. For example, as illustrated in FIG. 22, when address bits 23 and 24 are added, processor address bit 24 (LA:24) is multiplexed with processor address bit 5 (LA:5) in a multiplexer 950 to provide address input bit 10 (MA10L and MA10H) to the RAMs. Processor address bit 23 (LA:23) is multiplexed with processor address bit 5 (LA:5) in a two-to-one multiplexer (2:1 MUX) 952 in accordance with whether a 16 Megabyte SIMM is selected (configuration signal 16MEGSIMM active) or a 1 or 4 Megabyte SIMM is selected (16MEGSIMM inactive), and the resulting multiplexed signal is multiplexed with the latched processor address bit 9 (LA9) to provide the address input bit 2 (MA2L and MA2H) to the RAMs. Again, when a smaller sized SIMM is used, the higher numbered outputs of the multiplexer 950 are not connected (i.e., when 4 Megabyte SIMMs are used, the MA10L and MA10H signals are not connected, and when 1 Megabyte SIMMs are used, the MA9L and MA9H signals are also not used. The present invention makes is particularly easy to utilize different size SIMMs since the configuration signals are readily provided as part of a conventional configuration setup program that is run whenever the system parameters are changed (e.g., when the sizes of the SIMMs are changed).

Although the preferred embodiment of the present invention has been described and illustrated above, it will be appreciated by those skilled in the art that various changes and modifications can be made to the present invention without departing from its spirit. Accordingly, the scope of the present invention is deemed to be limited only by the scope of the following appended claims.

What is claimed is:

1. A memory system for use with a copy back cache system, said memory system optimizing a copy back/line fill operation comprising a copy back portion in which data are transferred from said cache system to said memory system and a line fill portion in which data are transferred from said memory system to said cache system, said copy back cache system providing a first address to said memory system for said copy back portion of said operation and providing a second address to said memory system for said line fill portion of said operation, said memory system comprising:

a dynamic random access memory (RAM) having a plurality of address input terminals, a row address select input terminal, a column address select input terminal and a write enable input terminal, said dynamic RAM operating to access a row of data storage cells when an address is applied to said address input terminals when said row address select input terminal is activated, said dynamic RAM operating to access at least one cell in said row of data storage cells when an address is applied to said address input terminal when said column address select input terminal is activated after said row address select input terminal is activated;

an address select circuit that receives address inputs from said cache system via an address input bus, said address select circuit receiving a first set of address bits that determine said first address where data is to be written into said dynamic RAM during said copy back portion and receiving a second set of address bits that determine said second address where data is to be read from said dynamic RAM during said line fill portion, said first set of address bits having a first plurality of address bits and a second plurality of address bits, said second set of address bits having a first plurality of address bits that are identical to said first plurality of address bits of said first set of address bits each time said copy back/line fill operation is performed, said second set of address bits having a second plurality of address bits that are different from said second plurality of address bits of said first set of address bits, said address select circuit operating to provide said first plurality of address bits of said first set of address bits to said address input terminals of said dynamic RAM as a row address at the beginning of said copy back portion of each said copy back/line fill operation and to provide said second plurality of address bits of said first set of address bits to said address input terminals of said dynamic RAM as a first column address at the beginning of said copy back portion of each said copy back/line fill operation, said address select circuit providing said second plurality of address bits of said second set of address bits to said address input terminals of said dynamic RAM as a second column address at the beginning of said line fill portion of each said copy back/line fill operation; and a memory control circuit that activates said row address select input terminal when said cache system provides said first set of address bits at the beginning of the copy back portion to select said first plurality of address bits of said first set of address bits as a single row address for both said copy back portion and said line fill portion of said copy back/line fill operation so that said row address does not change during said copy back/line fill operation.

2. A method of decreasing the time required to complete a copy back/line fill operation in a memory system connected to a cache system, comprising the steps of:

applying a first set of address bits from said cache system to said memory system during a copy back portion of each said copy back/line fill operation to select a location in said memory system to store data from said cache system, said first set of address bits comprising a first plurality of address bits and a second plurality of address bits;

applying a second set of address bits from said cache system to said memory system during a line fill portion of each said copy back/line fill operation to select a location in said memory system from which to read data to transfer to said cache system, said second set of address bits comprising a first plurality of address bits that are identical to said first plurality of address bits in said first set of address bits and comprising a second plurality of address bits that are different from said second plurality of address bits in said first set of address bits; and applying said first plurality of address bits from said first set of address bits to a dynamic random access memory as a single row address during both said copy back portion and said line fill portion of each said copy back/line fill operation while said second plurality of address bits from said first set of address bits is applied to said dynamic memory as a column address during said copy back portion and while said second plurality of address bits from said second set of address bits is applied to said dynamic memory during said line fill portion so that only a single row access of said dynamic random access memory is required to complete each said copy back/line fill operation.

3. A memory control circuit that drives a set of address inputs and a set of control inputs of a dynamic random access memory (RAM) connected to receive data from and transfer data to a copy back cache system that performs a copy back/line fill operation, said memory control circuit comprising:

a timing circuit that generates:

a row address select signal as a control input to said dynamic RAM for said copy back/line fill operation, a first column address select signal as a control input to said dynamic RAM during a copy back portion of said copy back/line fill operation, and a second column address select signal during a line fill portion of said copy back/line fill operation, wherein said first and second column address select signals are generated in sequence with no intervening row address select signal; and an address select circuit that receives a copy back address from said copy back cache system, said copy back address comprising a first plurality of address bits and a second plurality of address bits to select a location in said dynamic RAM to store data from said cache system, said address select circuit further receiving a line fill address from said copy back cache system, said line fill address comprising a third plurality of address bits and a fourth plurality of address bits to select a location in said dynamic RAM from which to retrieve data to transfer to said cache system, said third plurality of address bits being identical to said first plurality of address bits, said address select circuit applying said first plurality of address bits as a row address to said dynamic RAM when said row address select signal is activated, said row address remaining the same for said copy back portion and said line fill portion throughout each said copy back/line fill operation, said address select circuit applying said second plurality of address bits to said dynamic RAM when said first column address select signal is activated during said copy back portion and applying said fourth plurality of address bits to said dynamic RAM when said second column address select signal is activated.

4. A memory system for use with a copy back cache system wherein a copy back address for data to be written to said memory system from said cache system is provided to said memory system via an address bus and a line fill address for data to be retrieved from said memory system and transferred to said cache system is provided to said memory system via said address bus, said memory system comprising:

a dynamic memory having a plurality of address inputs that receive a row address during a first part of a memory access cycle and that receives a column address during a second part of a memory access cycle; and a memory controller that generates said row address and said column address from selected portions of said copy back address and said line fill address received via said address bus and that provides said row address and said column address to said dynamic memory, said portions of said copy back address and said line fill address selected so that a row address generated from said copy back address for a copy back/line fill operation is always the same as a row address generated from said line fill address for each said copy back/line fill operation, said memory controller applying said row address at the beginning of each said copy back/line fill operation and changing only the column addresses during each said copy back/line fill operation.

5. The memory system as defined in claim 4, wherein:

said memory system and said cache system are connected via said address bus to a microprocessor;

said microprocessor generates said line fill address; and said cache system generates said copy back address.

6. The memory system as defined in claim 4, wherein said memory controller comprises a state machine, said state machine having an idle state; a first plurality of line fill states that occur in sequence to cause said memory controller to generate a line fill operation; and a second plurality of copy back states that occur in sequence to generate a copy back operation, said state machine causing said memory controller to perform said copy back/line fill operation by sequencing through said copy back states and said line fill states without returning to said idle state until after said line fill states are operated.

7. The memory system as defined in claim 6, wherein said memory controller activates a row address select signal to said dynamic memory during said copy back states and maintains said row address select signal active when continuing into said line fill states.

* * * * *